(12) United States Patent
Henrot et al.

(10) Patent No.: US 12,465,125 B1
(45) Date of Patent: Nov. 11, 2025

(54) PROTECTIVE COVERS FOR ELECTRONIC DEVICES

(71) Applicant: Apple Inc., Cupertino, CA (US)

(72) Inventors: Camille I Henrot, San Francisco, CA (US); Linda D Benavente-Notaro, Menlo Park, CA (US); Weibing Gong, San Jose, CA (US); Benjamin A Shaffer, San Jose, CA (US); Robert V Tang, San Francisco, CA (US); Jenna L Withrow, Sunnyvale, CA (US); Xueqin Xu, Shenzhen (CN); Yan Wang, Hangzhou (CN); Zhe Cheng, Suzhou (CN); Haoyu Li, Shenzhen (CN); Tsung-Wen Su, Tainan (TW); Le Zhao, Shenzhen (CN); Charlotte M Baravian, Campbell, CA (US); Yiwei Tao, Campbell, CA (US); Alex Warburton, Squamish (CA); Emma Wardell, Pemberton (CA); James Griffin, Pemberton (CA); Andrew Campbell, Pemberton (CA); Thomas Richard Routh, Pemberton (CA)

(73) Assignee: Apple Inc., Cupertino, CA (US)

( * ) Notice: Subject to any disclaimer, the term of this patent is extended or adjusted under 35 U.S.C. 154(b) by 45 days.

(21) Appl. No.: 18/426,990

(22) Filed: Jan. 30, 2024

(51) Int. Cl.
*A45C 13/36* (2006.01)
*A45C 11/00* (2006.01)
(Continued)

(52) U.S. Cl.
CPC .............. *A45C 13/36* (2013.01); *A45C 11/24* (2013.01); *A45C 13/1053* (2013.01);
(Continued)

(58) Field of Classification Search
CPC ....... A45C 13/36; A45C 13/002; A45C 11/10; A45C 11/24; A45C 11/003; A45C 11/04;
(Continued)

(56) References Cited

U.S. PATENT DOCUMENTS

| 6,038,706 | A  | * | 3/2000 | Seiler ...................... | A61F 9/029 |
| | | | | | 206/5 |
| 6,907,617 | B2 | * | 6/2005 | Johnson .................. | A61F 9/025 |
| | | | | | 2/13 |

(Continued)

*Primary Examiner* — Rafael A Ortiz
(74) *Attorney, Agent, or Firm* — Treyz Law Group, P.C.; Kendall P. Woodruff

(57) ABSTRACT

A protective cover for a head-mounted device may include a cover layer and a ribbed fabric sidewall that together form a recess for receiving the head-mounted device. The cover layer may include a foam layer and a stiffener wrapped in fabric layers and may be configured to cover and protect an external display in the head-mounted device. The ribbed fabric sidewall may include a knit fabric layer and knit ribs on opposing sides of the knit fabric layer. The ribbed fabric sidewall may have a button receiving region and a pull tab region that are modified relative to other regions of the ribbed fabric sidewall by including fewer ribs, unfilled ribs, or ribs of different heights. A pull tab may hide a seam in the ribbed fabric sidewall. The seam may be formed from a filled pocket that provides a plush surface under the pull tab.

25 Claims, 19 Drawing Sheets

(51) Int. Cl.
*A45C 11/24* (2006.01)
*A45C 13/10* (2006.01)
*G02B 27/01* (2006.01)

(52) U.S. Cl.
CPC ........ *G02B 27/0176* (2013.01); *A45C 11/003* (2025.01); *G02B 2027/0156* (2013.01)

(58) Field of Classification Search
CPC ............ A45C 13/1053; G02B 27/0176; G02B 27/017
USPC ..... 206/701, 720, 722, 724, 320, 5, 301, 18, 206/70, 775; 2/209.13, 424, 9
See application file for complete search history.

(56) References Cited

U.S. PATENT DOCUMENTS

| | | | |
|---|---|---|---|
| 6,944,882 B2 * | 9/2005 | Lawrence | G02C 7/16 2/13 |
| 9,131,756 B2 | 9/2015 | Hurst et al. | |
| 9,507,155 B2 | 11/2016 | Morimoto | |
| 11,500,202 B2 | 11/2022 | Lee et al. | |
| 11,860,444 B2 | 1/2024 | Tao et al. | |
| 2013/0001104 A1 * | 1/2013 | Stutzman | A45C 11/04 53/473 |
| 2024/0045219 A1 * | 2/2024 | Crews | G02B 27/0176 |
| 2024/0094771 A1 * | 3/2024 | Cloyd | A45C 11/003 |

* cited by examiner

PROTECTIVE COVERS FOR ELECTRONIC DEVICES

FIELD

This relates generally to protective covers and, more particularly, to protective covers for wearable electronic devices.

BACKGROUND

Electronic devices such as watches and head-mounted devices often include sensitive components such as displays and glass housing members that are vulnerable to damage in the event of a drop or collision with another object. Electronic devices may be stowed away when not in use to protect sensitive components, but storing electronic devices away in storage containers can be cumbersome and impractical.

SUMMARY

A protective cover for a head-mounted device may include a cover layer and a ribbed fabric sidewall that together form a recess for receiving the head-mounted device. The cover layer may include a foam layer and a stiffener wrapped in fabric layers. The cover layer may be configured to cover and protect an external display on the head-mounted device. The ribbed fabric sidewall may include a knit fabric layer and knit ribs on opposing sides of the knit fabric layer.

The ribbed fabric sidewall may have a button receiving region and a pull tab region that are modified relative to other regions of the sidewall by including fewer ribs, unfilled ribs, or ribs of different heights.

A pull tab may hide a seam in the ribbed fabric sidewall. The seam may be formed from a filled pocket that provides a plush surface under the pull tab. The pull tab may include a first layer of fabric that forms a loop, a second layer of fabric that sandwiches the sidewall, and stitching that couples the first and second layers of fabric together such that the loop is biased away from the opening that receives the head-mounted device. An additional layer of fabric may be formed under the pull tab to hide piping in the sidewall.

DETAILED DESCRIPTION

Electronic devices such as wearable electronic devices may have sensitive components such as displays, other input-output components, glass housing structures, and/or other vulnerable components that may be prone to damage during a drop event or collision with another object. An electronic device may be provided with a removable protective cover to help protect sensitive components when the electronic device is not in use. The removable protective cover may include a cushion for covering a display in the electronic device and a ribbed fabric sidewall that surround a recess for receiving the electronic device. The ribbed fabric sidewall may have modified regions for accommodating input-output components such as buttons and or accommodating a pull tab with which the protective cover may be pulled onto the electronic device.

Figure 1:
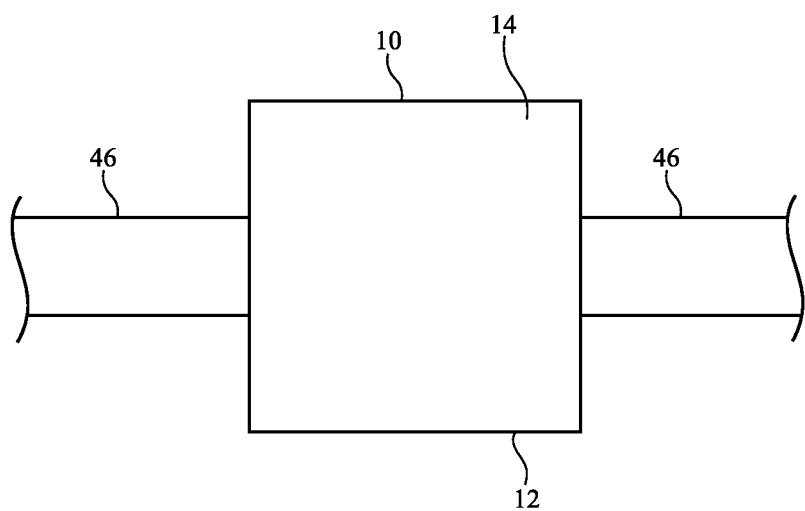
FIG. 1 is a top view of an illustrative electronic device having a display in accordance with an embodiment.

A top view of an illustrative electronic device that may be provided with a protective cover is shown in FIG. 1. As shown in FIG. 1, electronic device 10 may be a wearable electronic device 10 having one or more straps such as strap 46. In some configurations, device 10 may be a head-mounted device. For example, device 10 may include head-mounted support structures that help support device 10 on a user's head. The head-mounted support structures may support electronic components such as displays, integrated circuits, actuators, batteries, sensors, and/or other circuits and structures for device 10. The head-mounted support structures may form glasses, a hat, a helmet, goggles, and/or other head-mounted device.

Device 10 may include one or more displays such as display(s) 14. Display(s) 14 may include one or more display devices such as organic light-emitting diode display panels (panels with organic light-emitting diode pixels formed on polymer substrates or silicon substrates that contain pixel control circuitry), liquid crystal display panels, microelectromechanical systems displays (e.g., two-dimensional mirror arrays or scanning mirror display devices), display panels having pixel arrays formed from crystalline semiconductor light-emitting diode dies (sometimes referred to as microLEDs), and/or other display devices.

Device 10 may include glass housing structures such as glass cover layers that cover display 14. Glass cover layers may be curved (e.g., may have curved outer surfaces through which display 14 presents images) or may be planar. Arrangements in which the outer cover layer of display 14 is formed from other materials such as sapphire may also be used.

Device 10 may have left and right optical modules. Each optical module may include a respective display, lens, and support structure such as a lens barrel. For example, a left lens barrel may support a left display and a left lens, and a right lens barrel may support a right display and a right lens. The displays may include arrays of pixels or other display devices to produce images. For example, the displays may include organic light-emitting diode pixels formed on substrates with thin-film circuitry and/or formed on semiconductor substrates, pixels formed from crystalline semiconductor dies, liquid crystal display pixels, scanning display devices, and/or other display devices for producing images. Lenses may include one or more lens elements for providing image light from the displays to respective eyes boxes. Lenses may be implemented using refractive glass lens elements, using mirror lens structures (catadioptric lenses), using holographic lenses, and/or other lens systems. When a user's eyes are located in the eye boxes, the displays (display panels) operate together to form a display for device 10 (e.g., the images provided by respective left and right optical modules may be viewed by the user's eyes in the eye boxes so that a stereoscopic image is created for the user). The left image from the left optical module fuses with the right image from a right optical module while the display is viewed by the user.

In other arrangements, device 10 may be a wrist-mounted device such as a wristwatch, a health monitoring device, a media player, a wireless key, or other electronic device and/or equipment that includes the functions of two or more of these devices or other suitable devices. The wrist-mounted device may include a housing (e.g., a housing formed from metal, ceramic, plastic, glass, sapphire or other crystalline materials, and/or other suitable materials) and a display such as a liquid crystal display, an organic light-emitting diode display, or other suitable display.

Other configurations may be used for device 10. In general, device 10 may be any suitable wearable or non-wearable electronic device.

Strap 46 may have portions attached to opposing sides of device 10. Strap 46 may be configured to wrap around a user's head, wrist, or other body part.

To allow strap 46 to stretch and fit snugly but comfortably around the user's body, strap 46 may incorporate one or more stretchable materials such as stretchable polyurethane, polyethylene terephthalate, silicone, elastomeric silicon, and/or other elastomeric materials. Due to the presence of stretchable materials in strap 46, strap 46 may return to its original length after being stretched to fit onto the user's body. This allows a user to stretch strap 46 around the user's body. If desired, the fabric forming strap 46 may contain non-stretchable strands of material (e.g., polyester, etc.). Non-stretchable strands of material may, for example, be used to provide strap 46 with strength and/or moisture management capabilities. Arrangements in which strap 46 is formed from post-consumer recycled plastics such as post-consumer recycled polyethylene terephthalate drawn textured yarn may sometimes be described herein as an illustrative example.

Figure 2:
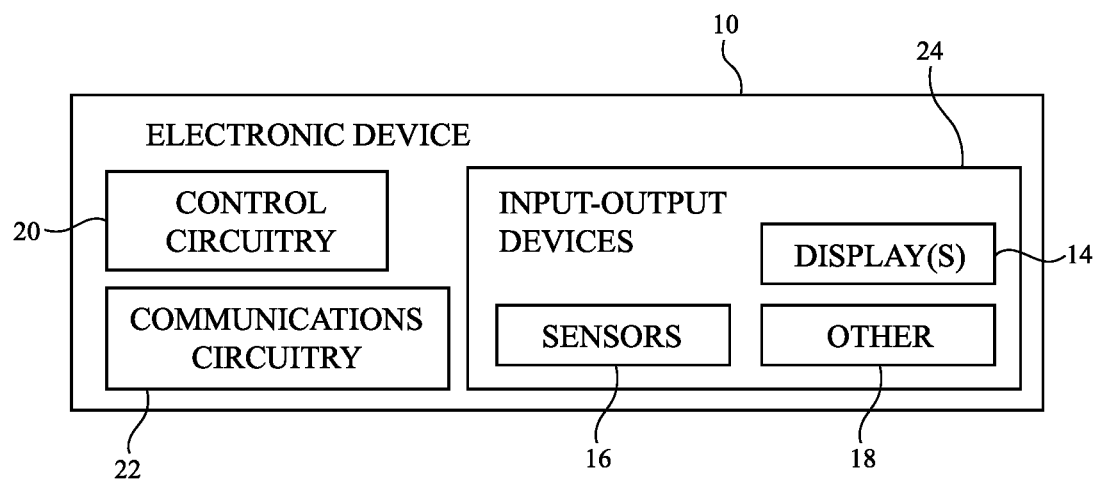
FIG. 2 is a schematic diagram of an illustrative electronic device in accordance with an embodiment.

A schematic diagram of an illustrative electronic device such as a head-mounted device, a wristwatch, or other electronic device is shown in FIG. 2. Device 10 of FIG. 2 may be operated as a stand-alone device and/or the resources of device 10 may be used to communicate with external electronic equipment. As an example, communications circuitry in device 10 may be used to transmit user input information, sensor information, and/or other information to external electronic devices (e.g., wirelessly or via wired connections). Each of these external devices may include components of the type shown by device 10 of FIG. 2.

As shown in FIG. 2, a wearable device such as device 10 may include control circuitry 20. Control circuitry 20 may include storage and processing circuitry for supporting the operation of device 10. The storage and processing circuitry may include storage such as nonvolatile memory (e.g., flash memory or other electrically-programmable-read-only memory configured to form a solid state drive), volatile memory (e.g., static or dynamic random-access-memory), etc. Processing circuitry in control circuitry 20 may be used to gather input from sensors and other input devices and may be used to control output devices. The processing circuitry may be based on one or more microprocessors, microcontrollers, digital signal processors, baseband processors and other wireless communications circuits, power management units, audio chips, application specific integrated circuits, etc. During operation, control circuitry 20 may use display(s) 14 and other output devices in providing a user with visual output and other output.

To support communications between device 10 and external equipment, control circuitry 20 may communicate using communications circuitry 22. Circuitry 22 may include antennas, radio-frequency transceiver circuitry, and other wireless communications circuitry and/or wired communications circuitry. Circuitry 22, which may sometimes be referred to as control circuitry and/or control and communications circuitry, may support bidirectional wireless communications between device 10 and external equipment (e.g., a companion device such as a computer, cellular telephone, or other electronic device, an accessory such as a point device, computer stylus, or other input device, speakers or other output devices, etc.) over a wireless link. For example, circuitry 22 may include radio-frequency transceiver circuitry such as wireless local area network transceiver circuitry configured to support communications over a wireless local area network link, near-field communications transceiver circuitry configured to support communications over a near-field communications link, cellular telephone transceiver circuitry configured to support communications over a cellular telephone link, or transceiver circuitry configured to support communications over any other suitable wired or wireless communications link. Wireless communications may, for example, be supported over a Bluetooth® link, a WiFi® link, a wireless link operating at a frequency between 10 GHz and 400 GHz, a 60 GHz link, or other millimeter wave link, a cellular telephone link, or other wireless communications link. Device 10 may, if desired, include power circuits for transmitting and/or receiving wired and/or wireless power and may include batteries or other energy storage devices. For example, device 10 may include a coil and rectifier to receive wireless power that is provided to circuitry in device 10.

Device 10 may include input-output devices such as devices 24. Input-output devices 24 may be used in gathering user input, in gathering information on the environment surrounding the user, and/or in providing a user with output. Devices 24 may include one or more displays such as display(s) 14. Display(s) 14 may include one or more display devices such as organic light-emitting diode display panels (panels with organic light-emitting diode pixels formed on polymer substrates or silicon substrates that contain pixel control circuitry), liquid crystal display panels, microelectromechanical systems displays (e.g., two-dimensional mirror arrays or scanning mirror display devices), display panels having pixel arrays formed from crystalline semiconductor light-emitting diode dies (sometimes referred to as microLEDs), and/or other display devices.

In arrangements where device 10 is a head-mounted device, displays 14 may include an inner (internal) display and an outer (external) display. An external display in displays 14 may include a liquid crystal display, an organic light-emitting diode display, a display with an array of crystalline semiconductor light-emitting diode dies, or a display based on other types of pixels. Inner displays in displays 14 may include left and right display devices (e.g., left and right components such as left and right scanning mirror display devices, liquid-crystal-on-silicon display devices, digital mirror devices, or other reflective display devices, left and right display panels based on light-emitting diode pixel arrays such as organic light-emitting display panels or display devices based on pixel arrays formed from crystalline semiconductor light-emitting diode dies, liquid crystal display devices panels, and/or or other left and right display devices in alignment with the user's left and right eyes, respectively). In other configurations, an inner display in displays 14 may include a single display panel that extends across both eyes or may use other arrangements in which content is provided with a single pixel array.

The inner display(s) 14 of device 10 may be used to display visual content for a user of device 10. The content that is presented on an inner display 14 may, for example, include virtual objects and other content that is provided to the display by control circuitry 20 and may sometimes be referred to as computer-generated content. An image on the display such as an image with computer-generated content may be displayed in the absence of real-world content or may be combined with real-world content. In some configurations, a real-world image may be captured by a camera (e.g., a forward-facing camera) so that computer-generated content may be electronically overlaid on portions of the real-world image (e.g., when device 10 is a pair of virtual reality goggles with an opaque display).

Outer display 14 (sometimes referred to as a publicly viewable display, an external display, etc.) in device 10 may be used in conveying information about the user's state to people in the vicinity of the user. The information that is conveyed using publicly viewable display 14 and/or other output components may include information on the user's appearance such as information on the appearance of the user's eyes and/or other facial features, information on the user's physiological state (e.g., whether the user is perspiring, is under stress, etc.), information on the user's emotions (e.g. whether the user is calm, upset, happy, sad, etc.), and/or other information on the state of the user. The information may be conveyed visually (e.g., using display 14 and/or light-emitting components such as light-emitting diode status indicator lights, dedicated visual output devices such as devices that illuminate icons, text, one or more different eye-shaped symbols, etc. without using a full pixel array, etc.) and/or may be conveyed in other forms (e.g., using sound such as tones, synthesized voice, sound clips, etc.). Illustrative configurations for device 10 in which information on the state of the user is displayed visually using a publicly viewable display such as display 14 may sometimes be described herein as an example.

Because display 14 is publicly viewable, visual information displayed on display 14 can be used to convey information about the state of the user to people who can view display 14 (e.g., people in the vicinity of the user). These people might normally be able to interact with the user by virtue of observing the user's eyes and other facial features that are now being obscured by the presence of device 10. By placing appropriate information on external display 14, control circuitry 20 can convey information about the user to others. The information may include text, graphics, and/or other images and may include still and/or moving content. The information that is displayed may be captured image data (e.g., captured images such as photographs and/or videos of facial features associated with the user) and/or may be computer-generated images (e.g., text, graphics such as user facial feature graphics, computer-processed photographs and/or videos, etc.). In some situations, information gathered by control circuitry 20 using input-output circuitry and/or wireless circuitry may be used in determining the content to be displayed on display 14.

The information displayed on external display 14 may be real (e.g., a genuine facial expression) or may be artificial (e.g., a synthetic facial expression that does not represent a user's true facial expression). Configurations in which the images that are displayed on external display 14 are representative of a user's true state help the user communicate with surrounding people. For example, if a user is happy, displaying a happy facial expression on display 14 will help the user convey the user's happy state to surrounding people. Configurations in which images that are displayed on display 14 are not representative of the user's true state may also be used to convey information to other people. If desired, a copy of the outwardly displayed facial expression or other publicly displayed information may be displayed on the user's private display 14 (e.g., in a corner region of the display, etc.) so that the user is informed of the current outward appearance of device 10.

The use of display 14 may help a user convey information about the user's identity to other people. Consider, as an example, a scenario in which display 14 displays a photographic image of the user's facial features. The displayed facial features of the user may correspond to facial features captured in real time using an inwardly facing camera and/or may correspond to previously captured facial feature images (still and/or moving). By filling in portions of the user's facial features that are otherwise obscured due to the presence of device 10, display 14 may help people in the vicinity of the user recognize the identity and facial expressions of the user.

Sensors 16 in input-output devices 24 may include force sensors (e.g., strain gauges, capacitive force sensors, resistive force sensors, etc.), audio sensors such as microphones, touch and/or proximity sensors such as capacitive sensors such as a touch sensor that forms a button, trackpad, or other input device), and other sensors. If desired, sensors 16 may include optical sensors such as optical sensors that emit and detect light, ultrasonic sensors, optical touch sensors, optical proximity sensors, and/or other touch sensors and/or proximity sensors, monochromatic and color ambient light sensors, image sensors, fingerprint sensors, iris scanning sensors, retinal scanning sensors, and other biometric sensors, temperature sensors, sensors for measuring three-dimensional non-contact gestures ("air gestures"), pressure sensors, sensors for detecting position, orientation, and/or motion (e.g., accelerometers, magnetic sensors such as compass sensors, gyroscopes, and/or inertial measurement units that contain some or all of these sensors), health sensors such as blood oxygen sensors, heart rate sensors, blood flow sensors, and/or other health sensors, radio-frequency sensors, depth sensors (e.g., structured light sensors and/or depth sensors based on stereo imaging devices that capture three-dimensional images), optical sensors such as self-mixing sensors and light detection and ranging (lidar) sensors that gather time-of-flight measurements, humidity sensors, moisture sensors, gaze tracking sensors, electromyography sensors to sense muscle activation, facial sensors, and/or other sensors. In some arrangements, device 10 may use sensors 16 and/or other input-output devices to gather user input. For example, buttons may be used to gather button press input, touch sensors overlapping displays can be used for gathering user touch screen input, touch pads may be used in gathering touch input, microphones may be used for gathering audio input, accelerometers may be used in monitoring when a finger contacts an input surface and may therefore be used to gather finger press input, etc.

If desired, electronic device 10 may include additional components (see, e.g., other devices 18 in input-output devices 24). The additional components may include haptic output devices, actuators for moving movable housing structures, audio output devices such as speakers, light-emitting diodes for status indicators, light sources such as light-emitting diodes that illuminate portions of a housing and/or display structure, other optical output devices, and/or other circuitry for gathering input and/or providing output. Device 10 may also include a battery or other energy storage device, connector ports for supporting wired communication with ancillary equipment and for receiving wired power, and other circuitry.

Figure 3:
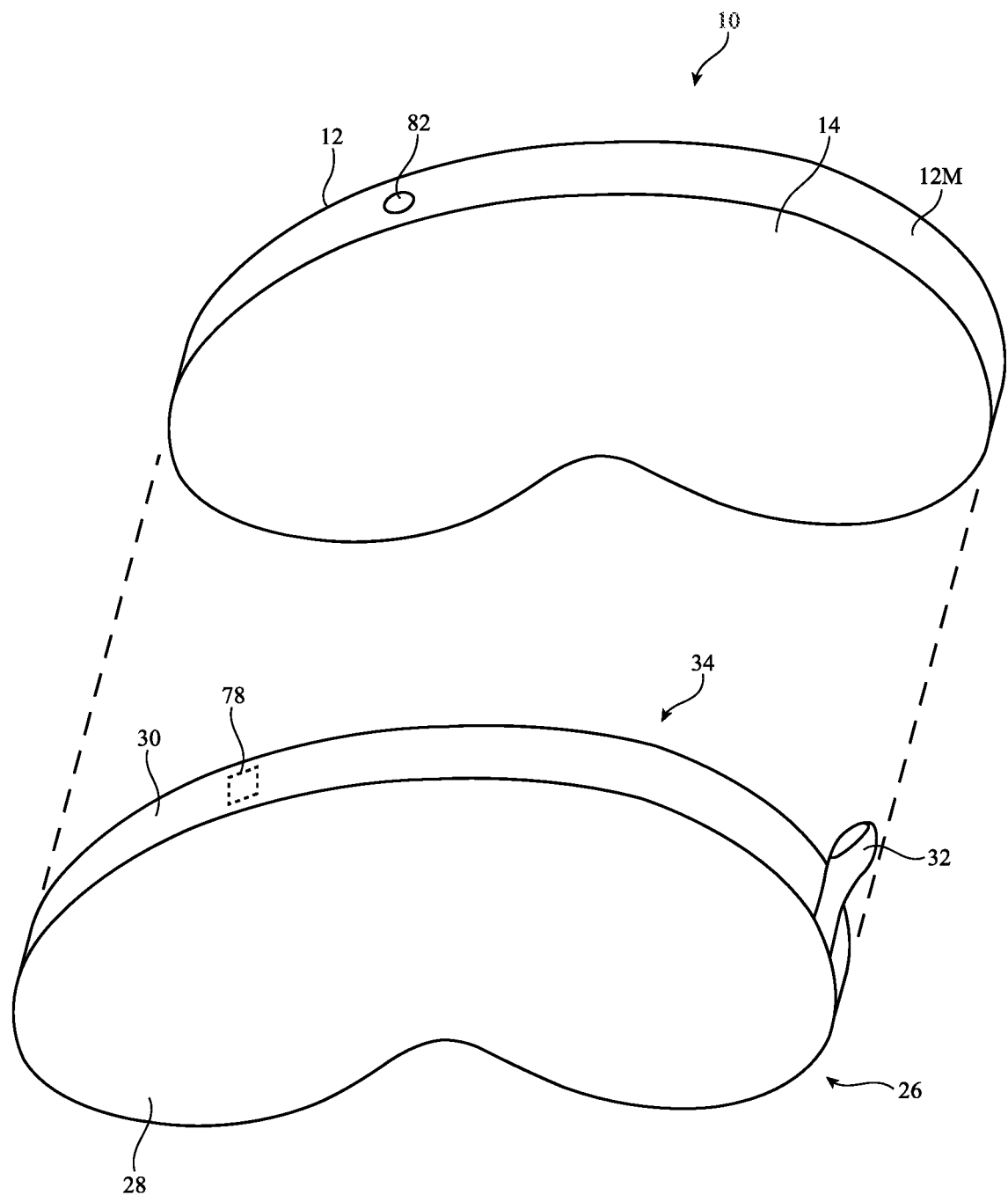
FIG. 3 is a perspective view of an illustrative protective cover and an electronic device having a display that is protected by the protective cover in accordance with an embodiment.

FIG. 3 is a perspective view of electronic device 10 and an illustrative protective cover for electronic device 10. As shown in FIG. 3, device 10 may include a display such as outer display 14 mounted in housing 12. Housing 12, which may sometimes be referred to as an enclosure or case, may be formed of plastic, glass, ceramics, fiber composites, metal (e.g., stainless steel, aluminum, etc.), other suitable materials, or a combination of any two or more of these materials. Housing 12 may be formed using a unibody configuration in which some or all of housing 12 is machined or molded as a single structure or may be formed using multiple structures (e.g., an internal frame structure, one or more structures that form exterior housing surfaces, etc.).

Display 14 may be protected using a display cover layer such as a layer of transparent glass, sapphire, or clear plastic. The display cover layer may form a planar front face for device 10, or the display cover layer may be formed from curved glass that forms a curved front face for device 10. The rear of housing 12 may be configured to rest against a user's face when device 10 is worn on the user's head. Housing sidewalls 12M may run around the periphery of housing 12 and may form a loop that frames the user's eyes.

If desired, openings may be formed in housing 12 to form communication ports (e.g., an audio jack port, a digital data port, a speaker port, etc.), to form openings for buttons such as button 82, etc. Buttons such as button 82 may be located on sidewall 12M of housing 12 or may be located elsewhere in device 10. Buttons such as button 82 may include power buttons, volume buttons, sleep and wake buttons, silent mode slider switches, and/or any other suitable buttons.

Device 10 may be protected using a protective cover such as protective cover 26. Protective cover 26 (sometimes referred to as a case, a removable case, a head-mounted device cover, a head-mounted device case, a display cover, etc.) may be removable. As shown in FIG. 3, cover 26 may have a display cover layer such as cover layer 28 and sidewalls such as sidewall 30. Cover layer 28 may have a shape that matches and aligns with the shape of display 14, or display 14 and cover layer 28 may have different shapes. Cover layer 28 and sidewall 30 may define a recess or opening such as recess 34. Recess 34 may be configured to receive device 10 when cover 26 is coupled to device 10. When device 10 is received within recess 34, sidewall 30 may extend around the periphery of sidewalls 12M of device 10.

In the example of FIG. 3, cover 26 surrounds device 10 to cover display 14 and sidewalls 12M, without covering the rear face of device 10. This is merely illustrative. If desired, cover 26 may be configured to fully enclose and cover device 10 within opening 34. Arrangements in which cover 26 includes pockets, flaps, hinged portions, straps, and other structures may also be used. The configuration of FIG. 3 is merely illustrative.

Cover layer 28 of cover 26 may include one or more cushioning layers such as a foam layer and one or more rigid layers such as a stiffener that provides structure to cover layer 28. When device 10 is received within opening 34, cover layer 28 may rest directly against display 14 or may be separated from display 14 by a gap. The foam layers in cover layer 28 may help protect display 14 from damage in the event of a drop or collision with another object. Cover layer 28 may include one or more inner soft fabric layers that help protect the outer glass layer of display 14 from scratches.

One or more portions of cover 26 may be formed from ribbed fabric. If desired, the ribbed fabric of cover 26 may have an appearance that matches ribbed fabric that forms strap 46 of device 10 (FIG. 1). This is merely illustrative, however. If desired, the ribbed fabric of cover 26 may have a different appearance from the ribbed fabric that forms strap 46.

Sidewall 30 of cover 26 may be formed from ribbed fabric that hugs sidewalls 12M of device 10 to help retain cover 26 on device 10. The ribbed fabric of sidewall 30 may have one or more modified regions such as button receiving region 78 for accommodating input-output devices on device 10 such as button 82. Button receiving region 78 may have fewer ribs, may have smaller ribs, may be free of ribs, may have unfilled ribs, and/or may have other features that allow button 82 to fit within cover 26 without excessive pressure being applied to button 82.

One or more pull tabs such as pull tab 32 may be formed on sidewall 30 and may be used to help pull cover 26 onto device 10. Cover 26 may have one, two, three, or more than three pull tabs 32 located at any suitable location on sidewall 30 (e.g., left and right sides, top and bottom sides, only on one side, more than one on a given side, etc.). Each pull tab 32 may be formed from one or more fabric layers, polymer layers, elastic layers, and/or other suitable materials. Pull tab 32 may extend from cover layer 28 or may extend from sidewall 30. Pull tab 32 may be used to hide a seam in sidewall 30, if desired. Sidewall 30 may have one or more modified pull tab regions to accommodate pull tabs such as pull tab 32. The modified regions may be free of ribs, may have smaller or larger ribs, may have ribs with tapered heights, may have a stuffed pocket to provide plushness under pull tab 32, and/or may have other features that accommodate pull tab 32.

Figure 4:
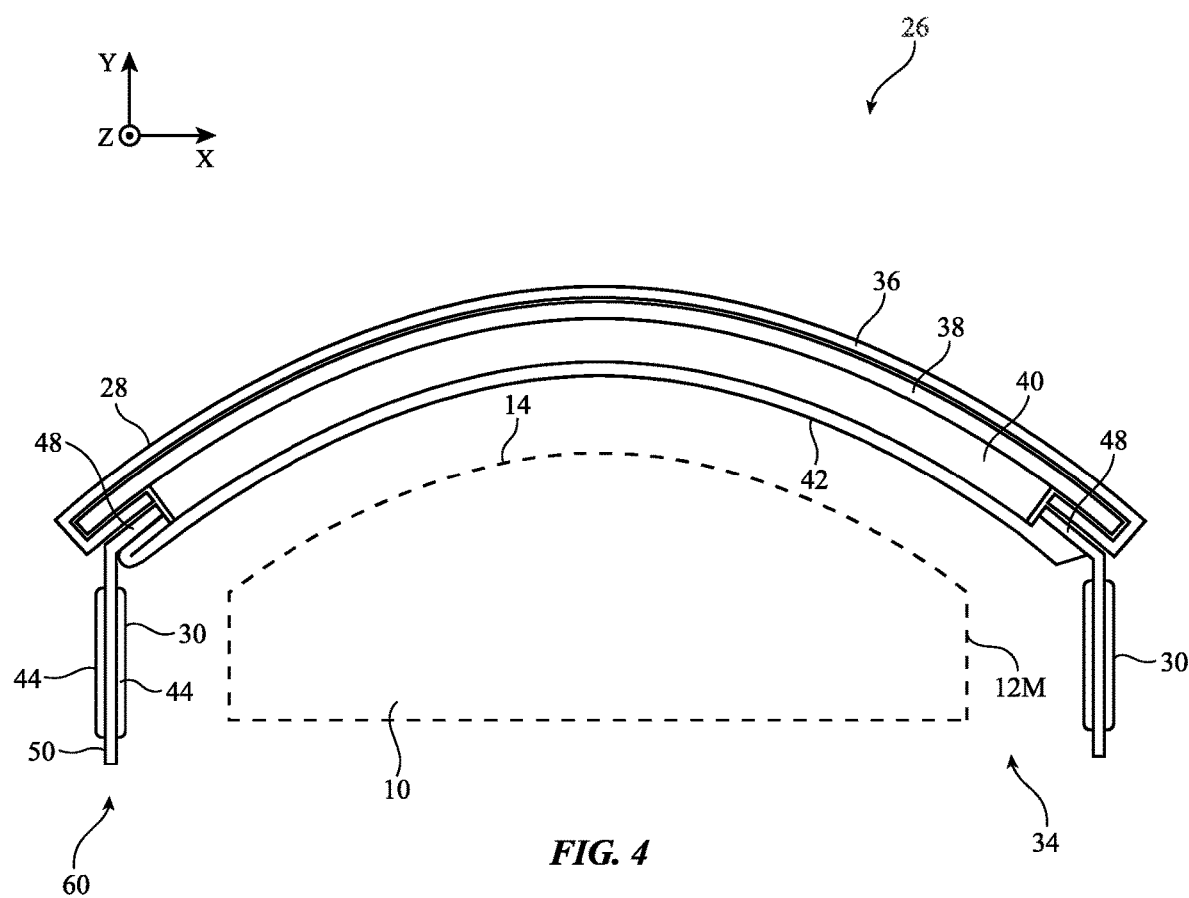
FIG. 4 is a top view of an illustrative protective cover having a rigid outer layer and ribbed sidewalls that surround a recess for receiving an electronic device in accordance with an embodiment.

FIG. 4 is a top view of an illustrative cover 26 that has been coupled to device 10. As shown in FIG. 4, cover 26 may include cover layer 28 that covers and protects external display 14 of device 10. Sidewall 30 may extend around the periphery of cover layer 28. Cover layer 28 and sidewall 30 may together define a recess such as recess 34 for receiving device 10. When device 10 is received within recess 34, sidewall 30 may wrap around sidewalls 12M of device 10. Sidewall 30 may have a stiffness and tension that allows sidewall 30 to retain cover 26 on device 10 without falling off.

As shown in FIG. 4, sidewall 30 may be formed from ribbed fabric such as ribbed fabric 60. Ribbed fabric 60 may include an inner stretchable fabric layer such as inner fabric layer 50. Inner fabric layer 50 may be formed from knit fabric such as a knit mesh fabric that allows layer 50 to stretch around sidewalls 12M of device 10. To provide cushioning on stretchable inner layer 50, fabric 60 may include one or more ribs such as ribs 44. Ribs 44 may be formed on one or both sides of inner fabric layer 50. For example, a first set of ribs 44 may be located on a first side of inner fabric layer 50, and a second set of ribs 44 may be located on a second opposing side of inner fabric layer 50. Ribs 44 may be formed from ottoman ribs, bengaline ribs, and/or any other suitable ribbed fabric construction. Ribs 44 may form air-filled pockets or ribs 44 may be filled with material such as filler strands.

Cover layer 28 may include one or more rigid layers to provide structure to cover layer 28, one or more foam layers to provide cushioning and protection to display 14, and one or more soft fabric layers to help protect display 14 from scratches. As shown in FIG. 4, for example, cover layer 28 may include one or more fabric layers such as inner fabric layer 42 and outer fabric layer 36, one or more cushioning layers such as cushion layer 40, and one or more rigid layers such as rigid layer 38. Outer fabric layer 36 may be formed from woven fabric, knit fabric (e.g., weft knit fabric, warp knit fabric, etc.), spacer fabric (e.g., inner and outer fabric layers joined by a spacer layer such as a monofilament strand), ribbed fabric, smooth fabric without ribs, and/or any other suitable type of fabric. Inner fabric layer 42 may be formed from a soft fabric such as a microfiber fabric or other suitable fabric that helps protect display 14 from scratches. Rigid layer 38 may be a rigid shell of plastic, metal, or other suitable stiffening material. Cushion layer 40 may be formed from a layer of foam or other soft filler material. Cushion layer 40 may have greater thickness than rigid layer 38 and may consume most of the volume of cover layer 28, if desired. Sidewall 30 may have edge portions 48 that are coupled to cover layer 28 using a seam (e.g., stitching, adhesive, molding, and/or any other suitable attachment mechanism). Edge portions 48 may, for example, be sandwiched and stitched between inner fabric layer 42 and outer fabric layer 36, if desired. Edge portions 48 may be formed without ribs (if desired) and/or may include fusible strands of material that are locally melted to create a stiffer fabric. By providing edge portions 48 without ribs and/or with stiffer fabric (e.g., locally melted fabric), sidewall 30 may have sufficient seam allowance for attaching sidewall 30 to cover layer 28.

In the example of FIG. 4, rigid layer 38 forms a rigid outer shell in cover layer 28. In particular, cushion layer 40 may be interposed between rigid layer 38 and inner fabric layer 42. Outer fabric layer 36 may wrap around rigid layer 38 to provide cover layer 28 with a rigid outer surface facing away from device 10.

Figure 5:
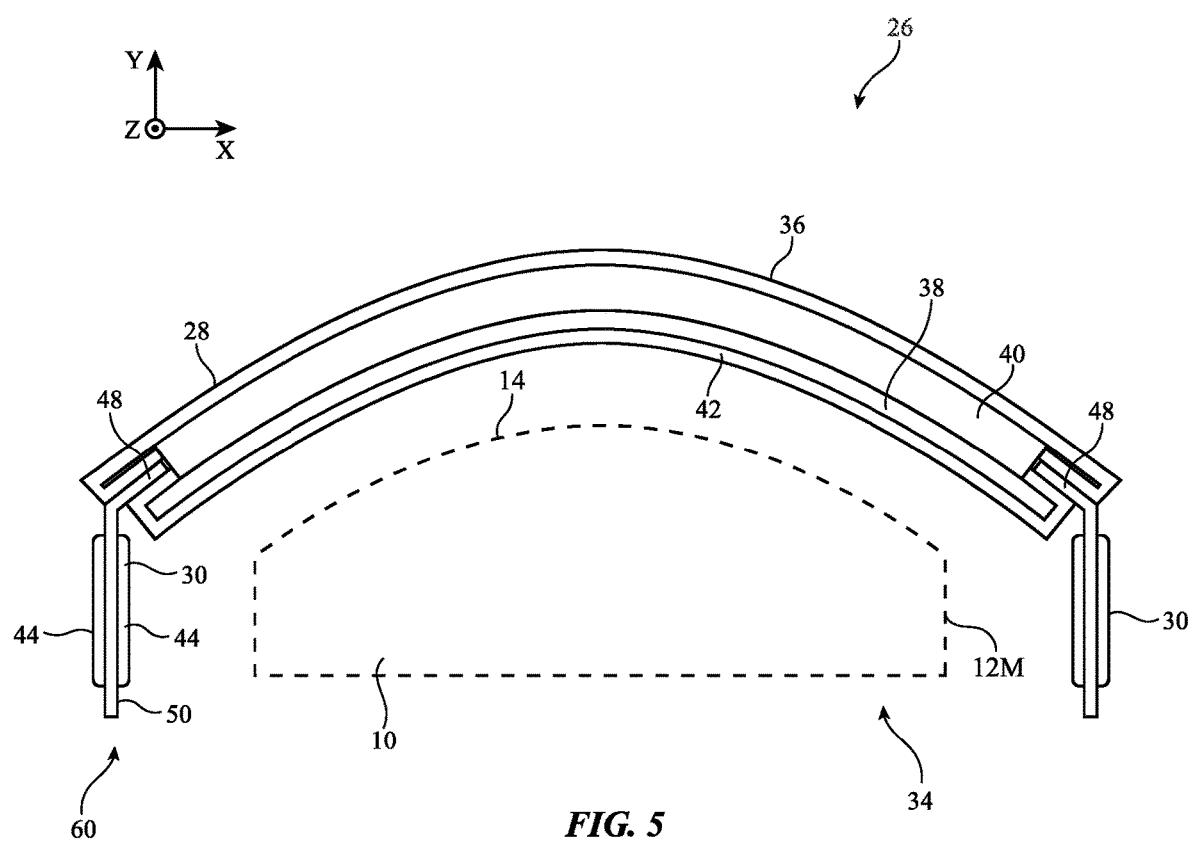
FIG. 5 is a top view of an illustrative protective cover having a rigid inner layer and ribbed sidewalls that surround a recess for receiving an electronic device in accordance with an embodiment.

If desired, rigid layer 38 may be located between cushion layer 40 and inner fabric layer 42, as shown in FIG. 5. With this type of arrangement, inner fabric layer 42 may wrap around rigid layer 38 to provide cover layer 28 with a rigid but soft inner surface facing device 10.

Figure 6:
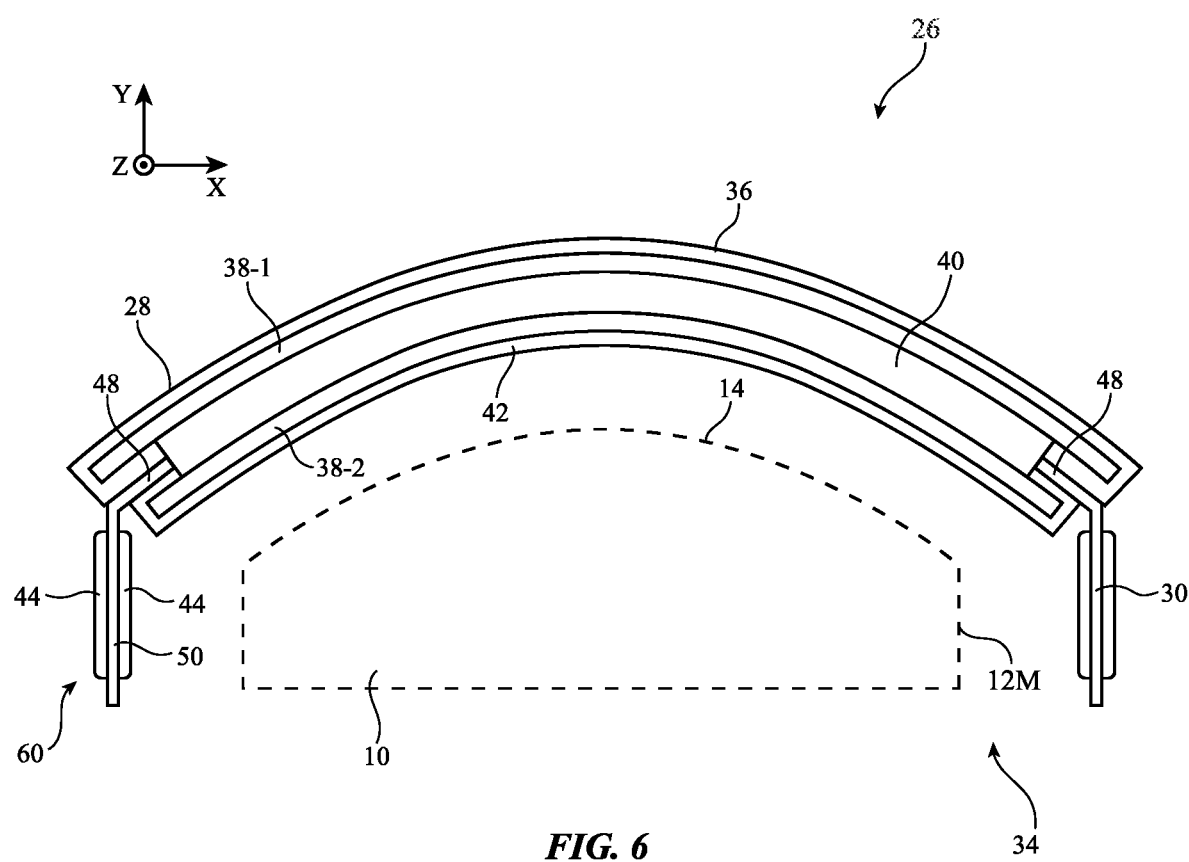
FIG. 6 is a top view of an illustrative protective cover having rigid inner and outer layers and ribbed sidewalls that surround a recess for receiving an electronic device in accordance with an embodiment.

In the example of FIG. 6, cushion layer 40 is sandwiched between two rigid layers such as outer rigid layer 38-1 and inner rigid layer 38-2. Outer fabric layer 36 may wrap around outer rigid layer 38-1 to provide cover layer 28 with a rigid outer surface facing away from device 10. Inner fabric layer 42 may wrap around inner rigid layer 38-2 to provide cover layer 28 with a rigid but soft inner surface facing device 10.

Figure 7:
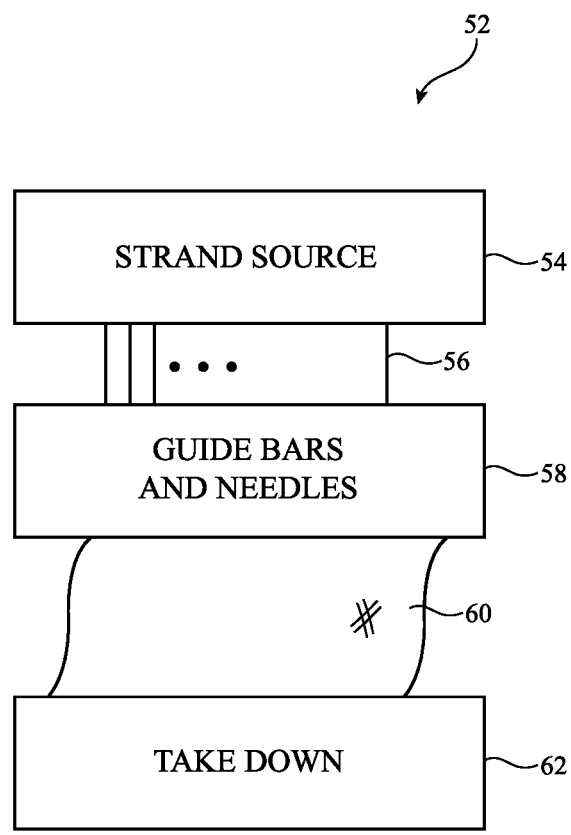
FIG. 7 is a schematic diagram of an illustrative knitting system in accordance with an embodiment.

A knitting machine or other equipment may be used in forming fabric for cover 26 such as ribbed fabric 60. FIG. 7 is a schematic diagram of an illustrative knitting system. As shown in FIG. 7, strand source 54 in knitting system 52 may be used in supplying strands 56 to guide and needle structures 58. Structures 58 may include strand guide structures (e.g., a system of movable guide bars with eyelets that guide strands 56) and needle systems (e.g., needle guide systems that guide sets of individually adjustable needles so that the needles may interact with the strands dispensed by the guide bars). During operations, a controller may control electrically adjustable positioners in system 52 to manipulate the positions of guide bars and needles in system 58 and thereby knit strands 56 into fabric such as fabric 60. Take down 62 (e.g., a pair of mating rollers or other equipment forming a take down system) may be used to gather fabric 60 that is produced during knitting.

Figure 8:
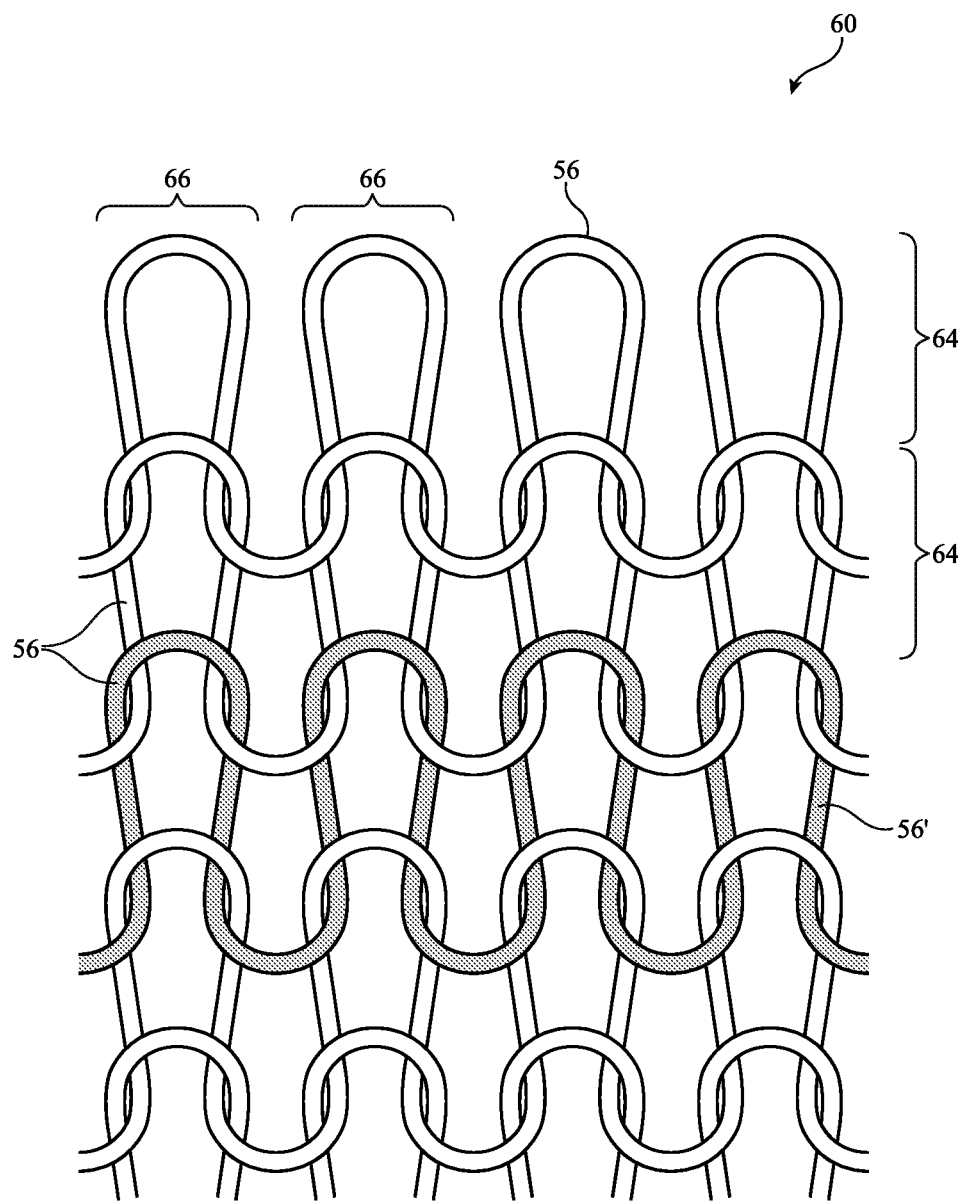
FIG. 8 is a front view of an illustrative layer of knit fabric in accordance with an embodiment.

A layer of illustrative knit fabric 60 is shown in FIG. 8. A knit fabric is made up of courses 64 (e.g., rows of loops formed by strands 56) and wales 66 (e.g., columns of loops formed by strands 56). In a weft knit fabric of the type shown in FIG. 8 (sometimes referred to as a flat knit fabric), strands 56 form loops that extend horizontally across the fabric. An illustrative strand 56' among strands 56 has been highlighted to show the horizontal path taken by each strand 56 in fabric 60. In contrast, a warp knit fabric includes wales 66 formed from strands 56 that follow zig-zag paths vertically down the fabric.

The example of FIG. 8 is merely illustrative. Fabric 60 of cover 26 may include warp knit fabric, weft knit fabric, flat knit fabric, circular knit fabric, braided fabric, woven fabric, spacer fabric (e.g., inner and outer warp knit fabric layers joined by a spacer layer), and/or fabric formed using any other interlacing technique. Arrangements in which fabric 60 of cover 26 is a knit fabric are sometimes described herein as an example.

Figure 9:
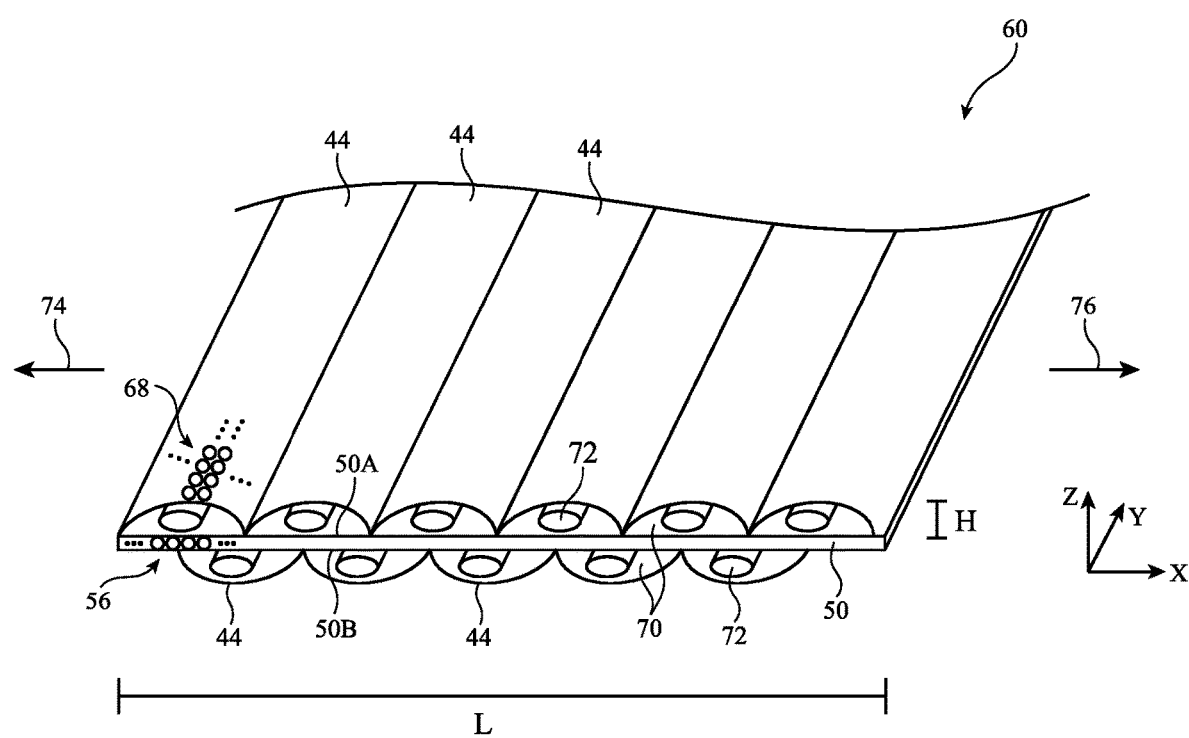
FIG. 9 is a perspective view of an illustrative ribbed fabric that may be used to form a sidewall in a protective cover in accordance with an embodiment.

FIG. 9 is a perspective view of an illustrative ribbed fabric 60 that may be used to form portions of cover 26 such as sidewall 30. Ribbed fabric 60 may include inner knit fabric layer 50 and ribs 44. A first set of ribs 44 may be located on first side 50A of inner fabric layer 50, and a second set of ribs 44 may be located on second opposing side 50B of inner fabric layer 50. One set of ribs 44 such as ribs 44 on first side 50A may face away from device 10 when cover 26 is located on device 10, while the other set of ribs 44 on second side 50B may face towards device 10 when cover 26 is located on device 10. Ribs 44 on first side 50A may be offset from the ribs 44 on second side 50B, if desired.

If desired, inner fabric layer 50 may have a lower gauge (e.g., a lower number of needles per inch) than ribs 44. For example, the gauge of inner fabric layer 50 may be equal to one-half of the gauge of the fabric that forms ribs 44. By skipping a needle in inner fabric layer 50, larger openings may be present in inner fabric layer 50, thereby forming a stretchable mesh fabric layer that expands in directions 74 and 76 when cover 26 is stretched around device 10. Although ribs 44 have a higher gauge than inner fabric layer 50, ribs 44 may have sufficient height relative to inner fabric layer 50 such that ribs 44 can freely expand and retract with inner fabric layer 50 without requiring additional force to extend inner fabric layer 50. The height of ribs 44 may be determined by the number of rows of loops that are used to form ribs 44. Each rib 44 may be formed with a higher number of rows of loops than that used to form the portion of inner fabric layer 50 under that given rib 44, so that ribs 44 can move with inner fabric layer 50 without requiring any stretching from ribs 44.

In some arrangements, inner fabric layer 50 may have the same gauge as the fabric that forms ribs 44. Using a higher gauge for inner fabric layer 50 may provide inner fabric layer 50 with less ability to stretch in directions 74 and 76. This in turn can help tune the elasticity of ribbed sidewall 30 of cover 26 to achieve the desired retention capabilities of cover 26.

Ribs 44 may extend perpendicular to the direction of desired stretch. For example, as shown in FIG. 9, ribs 44 extend parallel to the Y-axis, which allows ribs 44 to stretch in directions 74 and 76 (e.g., parallel to the X-axis) when cover 26 is placed on device 10. This is merely illustrative, however. Ribs 44 may extend in any suitable direction (e.g., parallel to the X-axis, oriented at an angle between the X-axis and the Y-axis, etc.). Arrangements in which different ribs 44 follow different paths may also be used. Ribs 44 may be segmented, curved, zig-zagged, oriented in different angles, etc. Ribs 44 may all have the same size and be formed from the same materials and fabric construction, or ribs 44 may have one or more different characteristics such as different sizes, shapes, materials, fabric construction, etc.

If desired, some or all of ribs 44 may be filled with air pockets. In particular, openings 70 may be formed in ribs 44 and may be partially or completely filled with air. Openings 70 may extend parallel to ribs 44 (e.g., perpendicular to the direction of elongation) and may be located between the fabric that forms ribs 44 and inner fabric layer 50. This allows cover 26 to remain lightweight while still providing sufficient cushion and padding on device 10. In some arrangements, openings 70 are partially or completely filled with a filler material such as filler material 72 that helps maintain the structure and shape of ribs 44 while still allowing fabric 60 to stretch.

When forming fabric 60, strands 56 may be knitted into rows of loops such as loops 68. Each rib 44 may be supported by a portion of inner fabric layer 50. During knitting operations, knitting equipment 52 may knit a first set of rows of loops 68 to form a given one of ribs 44. The number of rows of loops 68 that are used to form each rib 44 will determine the height of that rib relative to inner fabric layer 50. After forming a first rib 44 on a first side 50A, knitting equipment 52 may then knit rows of loops 68 to form a given portion of inner fabric layer 50 that will support the first rib 44. Knitting equipment 52 may then knit rows of loops 68 to form a second rib 44 on second side 50B, followed by knitting rows of loops 68 to form another portion of inner fabric layer 50 that will support the second rib 44. This process may continue in an alternating fashion, with knitting equipment 52 knitting rows of loops 68 for a rib 44 on one side, then knitting rows of loops 68 to form a portion of inner fabric layer 50 for supporting that rib, then knitting rows of loops 68 for a rib 44 on the other side, then knitting rows of loops 68 to form a portion of inner fabric layer 50 for supporting that rib 44, etc. When fabric 60 is in an unstretched state, inner fabric layer 50 may not be visible between ribs 44 (or may be barely visible between ribs 44).

Ribs 44 may have sufficient height relative to inner fabric layer 50 so that ribs 44 can accommodate stretching of inner fabric layer 50 without increasing or significantly increasing the force needed to extend inner fabric layer 50. The height of ribs 44 relative to inner fabric layer 50 may be determined by the number of rows of loops 68 that are used to form ribs 44 and the number of rows of loops that are used to from inner fabric layer 50. To provide ribs 44 with sufficient height relative to inner fabric layer 50, the number of rows of loops 68 that are used to form a given rib 44 may be greater than the number of rows of loops 68 that are used to form the portion of inner fabric layer 50 that supports that given rib 44. This allows ribs 44 to move with inner fabric layer 50 as inner fabric layer 50 is stretched in directions 74 and 76. For example, when fabric 60 stretches in directions 74 and 76, height H of ribs 44 may decrease as length L of fabric 60 increases. In addition to accommodating stretching of inner fabric layer 50, ribs 44 may permit bending of inner fabric layer 50 as fabric 60 wraps around sidewalls 12M of device 10. The raised height of ribs 44 relative to inner fabric layer 50 may allow ribs 44 to move with inner fabric layer 50 as it bends, rather than inhibiting bending movement.

Figure 10:
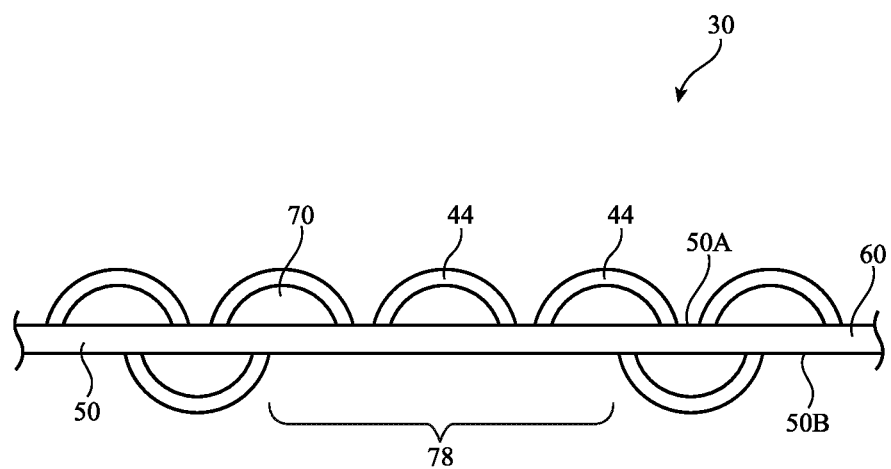
FIG. 10 is a side view of an illustrative ribbed fabric sidewall having a region without ribs to accommodate an input-output device in an electronic device in accordance with an embodiment.
Figure 11:
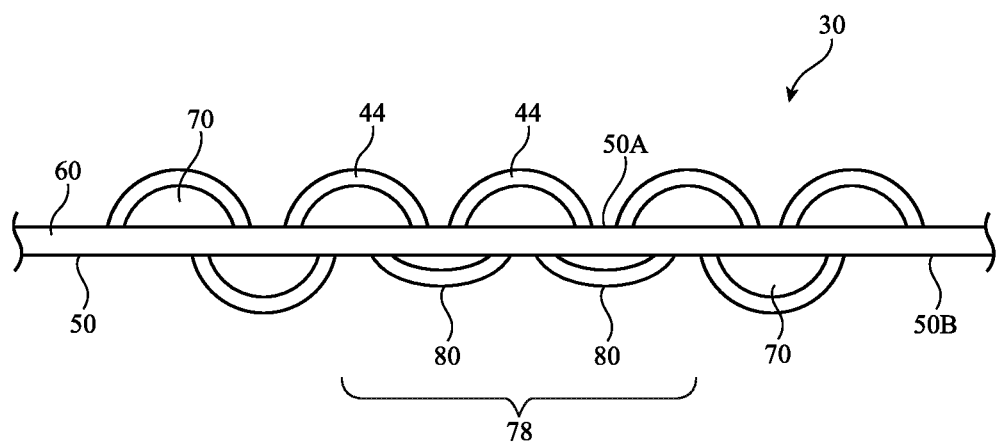
FIG. 11 is a side view of an illustrative ribbed fabric sidewall having a region with smaller ribs to accommodate an input-output device in an electronic device in accordance with an embodiment.
Figure 12:
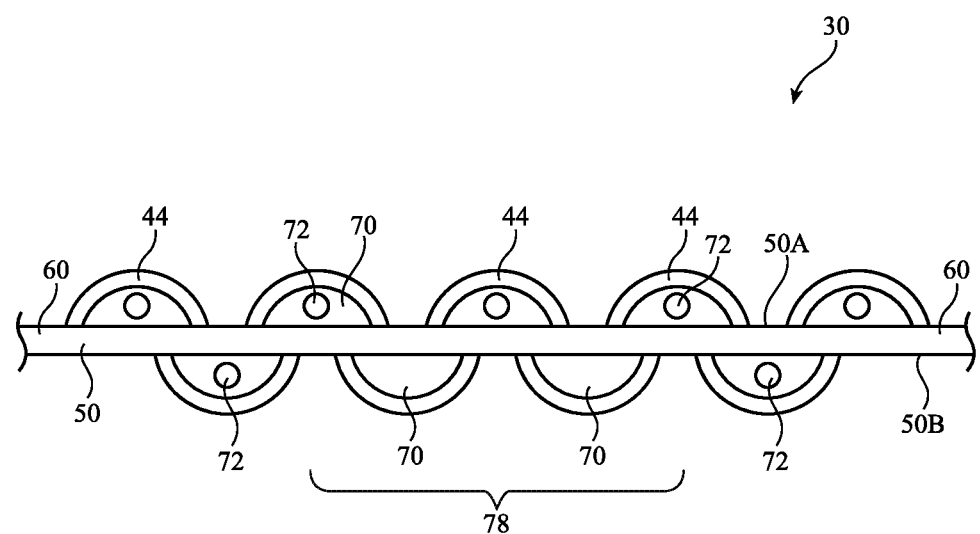
FIG. 12 is a side view of an illustrative ribbed fabric sidewall having a region with unfilled ribs to accommodate an input-output device in an electronic device in accordance with an embodiment.

Ribbed fabric 60 of sidewall 30 may include one or more modified regions to accommodate features on device 10 such as input-output components. For example, as discussed in connection with FIG. 3, ribbed fabric 60 may include button receiving region 78 that aligns with input-output components on device 10 such as button 82 or other suitable input-output device. Tension and stiffness within ribbed fabric 60 may be helpful for retaining cover 26 on device 10, but care should be taken that sidewall 30 does not apply to excessive pressure to input-output devices on device 10 such as button 82. In order to accommodate button 82, modified region 78 of sidewall 30 may be formed without ribs 44, may be formed with smaller ribs 44, may be formed with unfilled ribs 44 that are more flexible that surrounding filled ribs 44, and/or may have other configurations to reduce pressure on button 82. FIGS. 10, 11, and 12 show illustrative examples of how button receiving region 78 of sidewall 30 may be modified to accommodate button 82.

In the example of FIG. 10, modified region 78 includes fewer ribs 44 than surrounding regions of ribbed fabric 60 of sidewall 30. In particular, ribs 44 on side 50B of fabric 60 (e.g., the side of fabric 60 that faces device 10 when cover 26 is attached to device 10) may have a gap in region 78 that aligns with button 82. The absence of ribs 44 in region 78 on side 50B provides space for button 82 so that fabric 60 does not apply excessive pressure to button 82. On side 50A, ribs 44 may be present in region 78 because side 50A faces away from device 10. This allows the outward appearance of fabric 60 to remain uniform across region 78 while providing space on side 50B for button 82.

In the example of FIG. 11, modified region 78 includes smaller ribs 44 than surrounding regions of ribbed fabric 60 of sidewall 30. In particular, ribs 44 on side 50B of fabric 60 (e.g., the side of fabric 60 that faces device 10 when cover 26 is attached to device 10) may include reduced height ribs 80. Reduced height ribs 80 on side 50B may be formed using fewer rows of loops 68 (FIG. 9) than the surrounding ribs 44 on side 50B. The reduced height of ribs 80 in region 78 on side 50B provides space for button 82 so that fabric 60 does not apply excessive pressure to button 82. On side 50A, ribs 44 of uniform height with the surrounding region may be present in region 78 because outer side 50A faces away from device 10. This allows the outward appearance of fabric 60 to remain uniform across region 78 while providing space on inner side 50B for button 82.

In the example of FIG. 12, modified region 78 includes more flexible ribs than surrounding regions of ribbed fabric 60 of sidewall 30. In particular, ribs 44 on side 50B that are outside of region 78 may be filled with a filler material such as filler strand 72, whereas ribs 44 on side 50B that are within region 78 may be unfilled ribs, resulting in more flexible ribs 44 in region 78. The increased flexibility of ribs 44 in region 78 on side 50B allows button 82 to be received within region 78 without experiencing excessive force from sidewall 30. On side 50A, ribs 44 may be filled or unfilled across region 78 depending on the desired flexibility or rigidity of sidewall 30.

Figure 13:
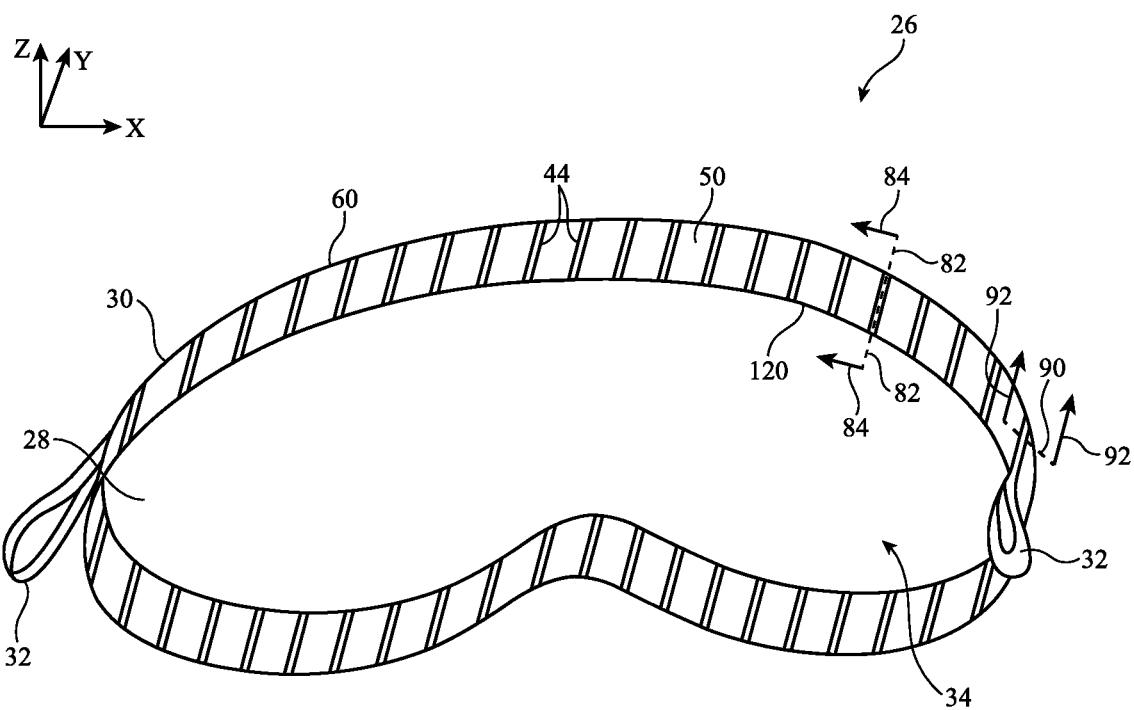
FIG. 13 is a perspective view of an illustrative protective cover having a ribbed fabric sidewall and one or more pull tabs in accordance with an embodiment.

FIG. 13 is a perspective view of cover 26 showing how ribbed fabric 60 of sidewall 30 may extend around the periphery of cover layer 28. Each rib 44 may extend parallel to the Y-axis of FIG. 13, allowing for stretch and flexibility across the X-Z plane of FIG. 13 as cover 26 is mounted onto device 10. The amount of tension in sidewall 30 may be tuned to achieve the desired level of retention of cover 26 on device 10. Ribbed fabric 60 may, for example, include piping along one or more edges such as edge 120 of sidewall 30 to help tune the tension of sidewall 30 so that cover 26 can retain itself on device 10 without falling off. A side view of illustrative piping along edge 120 is shown in FIG. 14.

Figure 14:
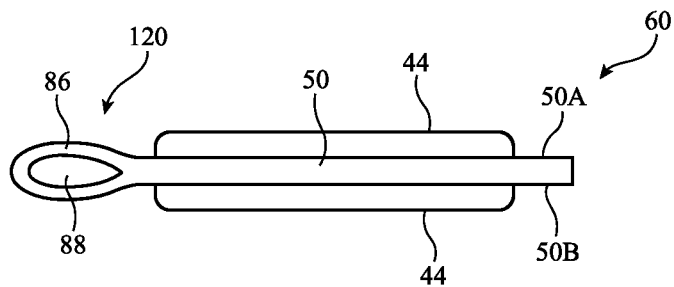
FIG. 14 is a side view of the illustrative protective cover of FIG. 13 showing how a ribbed fabric sidewall may include piping along one or more edges in accordance with an embodiment.

FIG. 14 is a side view of ribbed fabric 60 taken along line 82 and viewed in direction 84. As shown in FIG. 14, inner fabric layer 50 may include piping 86 along edge 120. Piping 86 may be one-ply piping, two-ply piping, or other suitable piping that creates opening 88 along edge 120. Opening 88 may be unfilled (e.g., air-filled) or may be filled with filler material such as one or more strands, cords, wires, or other filler material that can be used to adjust the stiffness and tension within edge 120. Piping 86 and opening 88 may form a continuous loop along edge 120 that frames sidewalls 12M of device 10, or piping 86 and opening 88 may only be located in certain portions of edge 120.

Piping 86 may serve as an elastic band that locks cover 26 onto device 10 after insertion into opening 34. The elasticity, tension, and geometrical shape of piping 86 can be tuned by modifying one or more properties of piping 86 (e.g., relative to the rest of ribbed fabric 60) such as the fusibility of strands 56 that form piping 86, the density of the fabric construction that forms piping 86, the diameter of strands 56 that form piping 86, the number of strands 56 that form piping 86, the material of strands 56 that form piping 86 (e.g., polyethylene terephthalate versus silicone, etc.), and/or other material properties of piping 86. Fusible or low temperature melt yarns can be locally melted to achieve stiffer regions within piping 86, or fusible strands can be melted globally across piping 86. In some arrangements, one or more strands 56 may be located within opening 88 of piping 86. For example, one, two, or more than two strands of covered yarn (e.g., silicone-covered yarn) may be enclosed within opening 88 of piping 86 to increase stiffness and help with recovery of piping 86 after being stretched. If desired, the tension of piping 86 can be tuned independently of ribbed fabric 60. For example, piping 86 may be constructed with relatively high tension and ribs 44 may be constructed with relatively low tension (e.g., less tension than piping 86).

Figure 15:
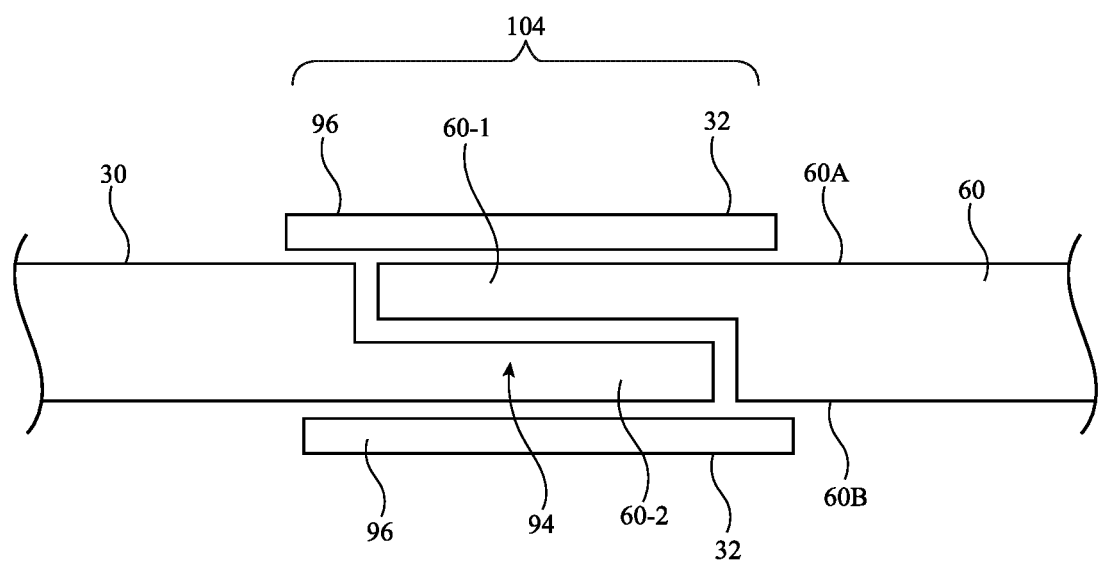
FIG. 15 is a side view of the illustrative protective cover of FIG. 13 showing how a ribbed fabric sidewall may include a seam that is hidden by a pull tab in accordance with an embodiment.

Ribbed fabric 60 may include one or more seams. For example, sidewall 30 may be formed from a strip of ribbed fabric having first and second opposing edges that are joined along a seam. If desired, the seam within ribbed fabric 60 may be hidden using other features within cover 26. For example, as shown in FIG. 15, ribbed fabric 60 may include a seam 94 that is hidden using pull tab 32. FIG. 15 is a side view of fabric 60 of FIG. 13 taken along line 90 and viewed in direction 92. Seam 94 may be a lap joint or other suitable seam that joins opposing edges of fabric 60 together such as first edge 60-1 and second edge 60-2. Stitching, adhesive, clips, or other suitable attachment structures may be used to attach first edge 60-1 to second edge 60-2 along seam 94.

Seam 94 may be located in pull tab region 104 where pull tab 32 is located. Pull tab 32 may include loop material 96. Loop material 96 may be one or more layers of fabric, polymer, silicone, or other suitable material that forms a loop. The loop formed by loop material 96 (sometimes referred to as fabric 96) may be configured to receive a user's finger when the user is pulling cover 26 onto device 10. As shown in FIG. 15, seam 94 is interposed between and hidden by a first portion of fabric 96 on outer surface 60A of fabric 60 and a second portion of fabric 96 on the opposing inner surface 60B of fabric 60. Stacking seam 94 between first and second portions of fabric 96 of pull tab 32 provides sidewall 30 with a visually attractive appearance (by hiding seam 94) while also increasing the robustness and integrity of seam 94.

Figure 16:
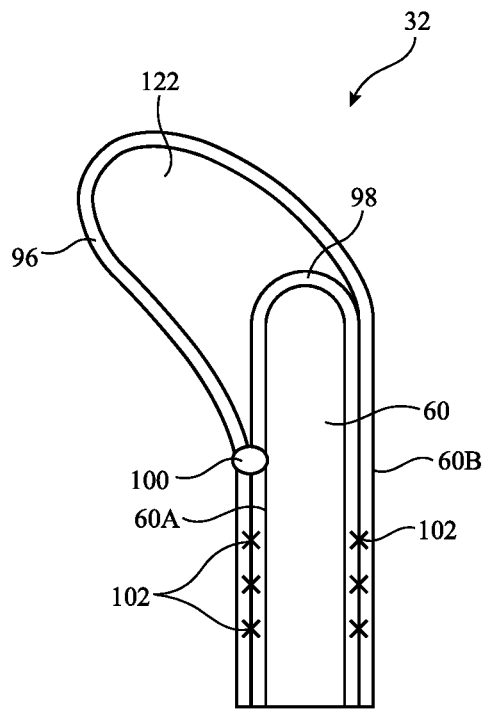
FIGS. 16, 17, and 18 are side views of illustrative pull tabs with different attachment points in accordance with some embodiments.
Figure 17:
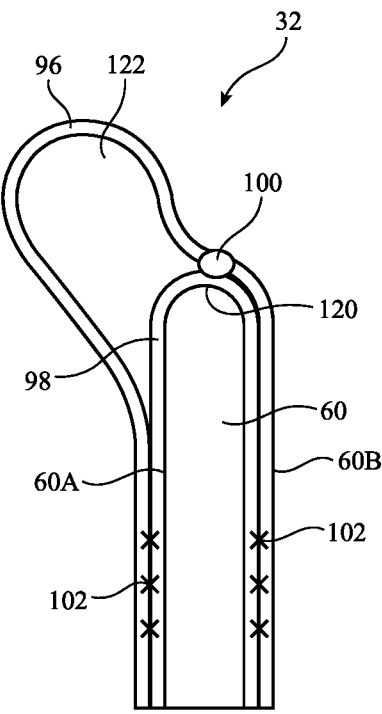
Figure 18:
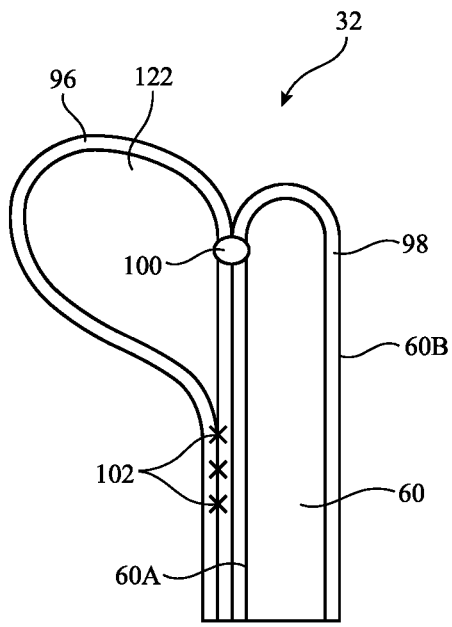

FIGS. 16, 17, and 18 are side views of illustrative pull tabs 32 with different attachment points to achieve different loop shapes that help avoid pull tab 32 interfering with device insertion into opening 34 of cover 26. In particular, pull tab 32 may have attachment points that help bias pull tab 32 away from opening 34 so that pull tab 32 does not inadvertently become caught between device 10 and opening 34.

As shown in FIG. 16, pull tab 32 may include first and second fabric layers such as fabric 96 and fabric 98. Fabric 98 may wrap around outer side 60A and inner side 60B of fabric 60 of sidewall 30. Fabric 96 may be coupled to fabric 98 and may form a loop such as loop 122 for receiving a user's finger. Fabric 98 and fabric 96 may be coupled together using adhesive and/or using seams such as stitching between layer 96 and layer 98. In the example of FIG. 16, fabric 98 and fabric 96 are attached together using adhesive connections 102 and stitching 100. Adhesive connections 102 between fabric 98 and fabric 96 may be formed on opposing sides 60A and 60B of fabric 60. Stitching 100 may be formed on outer surface 60A of fabric 60 (e.g., facing away from opening 34 and device 10). Opening 122 of pull tab 32 may be biased away from opening 34. In this example, stitching 100 is interposed between adhesive connections 102 on outer surface 60A and loop 122 of pull tab 32.

In the example of FIG. 17, fabric 98 and fabric 96 are attached together using adhesive connections 102 and stitching 100. Adhesive connections 102 between fabric 98 and fabric 96 may be formed on opposing sides 60A and 60B of fabric 60. Stitching 100 may be formed on outer surface 60A of fabric 60 (e.g., facing away from opening 34 and device 10), or stitching 100 may be formed on edge surface 120 of fabric 60, as shown in FIG. 17. In this example, loop 122 is interposed between stitching 100 and adhesive connections 102 on outer surface 60A.

In the example of FIG. 18, fabric 98 wraps around both sides 60A and 60B of fabric 60, while fabric 96 is only located on outer side 60A of fabric 60. Fabric 98 and fabric 96 are attached together using adhesive connections 102 and stitching 100. Adhesive connections 102 may be located on outer side 60A of fabric 60. Stitching 100 may be formed on outer surface 60A of fabric 60 (e.g., facing away from opening 34 and device 10), and loop 122 of pull tab 32 may be biased away from opening 34. In this example, loop 122 is interposed between adhesive connections 102 on outer surface 60A and stitching 100 of pull tab 32.

It may be desirable to modify portions of ribbed fabric 60 to accommodate pull tab 32. For example, ribs 44 may be removed in pull tab region 104 when it is desired to have pull tab 32 be flush with surrounding ribs 44, or ribs 44 may have modified heights in pull tab region 104 when it is desired to have a plush surface under pull tab 32. FIGS. 19, 20, 21, 22, 23, 24, and 25 show illustrative examples of how fabric 60 may be modified in pull tab region 104 relative to other regions of fabric 60 of sidewall 30.

Figure 19:
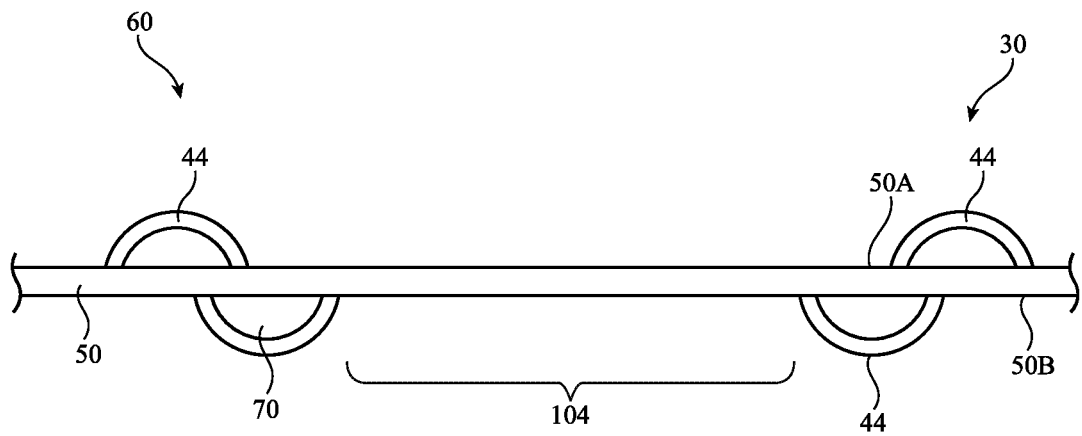
FIG. 19 is a side view of an illustrative ribbed fabric sidewall having a region without ribs to accommodate a pull tab in accordance with an embodiment.

In the example of FIG. 19, pull tab region 104 (sometimes referred to as modified region 104) includes fewer ribs 44 than surrounding regions of ribbed fabric 60 of sidewall 30. In particular, ribs 44 on side 50A and side 50B of fabric 60 may have a gap in region 104 that aligns with pull tab 32. The absence of ribs 44 in region 104 on side 50A and side 50B provides space for pull tab 32 so that pull tab 32 has lower height or is flush with the surrounding ribs 44 of fabric 60.

Figure 20:
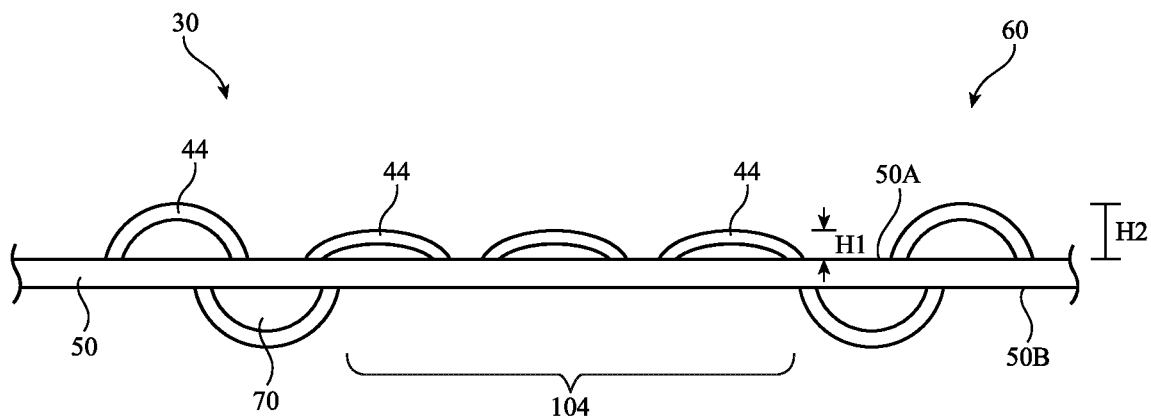
FIG. 20 is a side view of an illustrative ribbed fabric sidewall having a region with smaller ribs to accommodate a pull tab in accordance with an embodiment.

In the example of FIG. 20, pull tab region 104 includes smaller and/or fewer ribs 44 than the surrounding regions of ribbed fabric 60. In particular, ribs 44 in region 104 on side 50A of fabric 60 may include ribs 44 of a first height H1 in region 104, whereas ribs 44 outside of region 104 on side 50A of fabric 60 may include ribs 44 of a second height H2 that is greater than height H1. Ribs 44 on side 50B may be absent in region 104 or may have a smaller height similar to ribs 44 in region 104 on side 50A.

Figure 21:
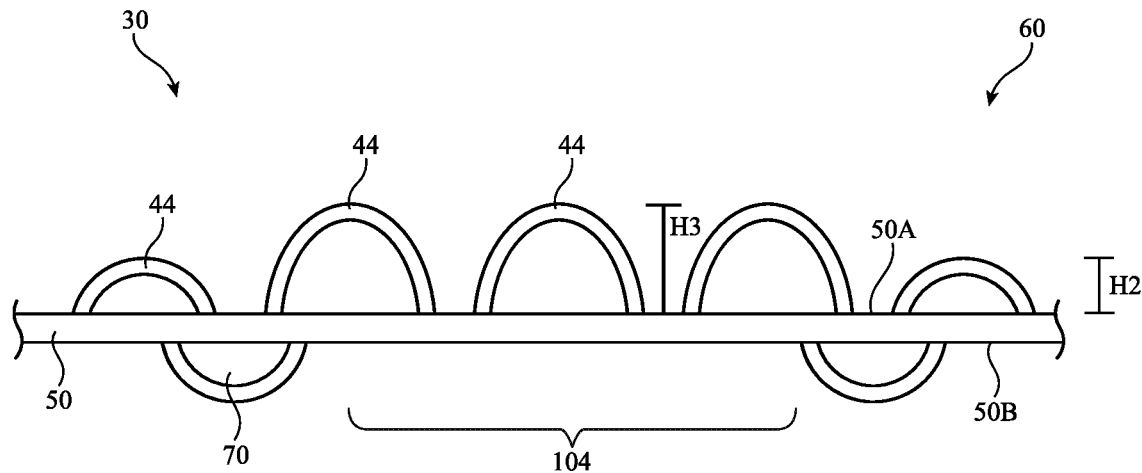
FIG. 21 is a side view of an illustrative ribbed fabric sidewall having a region with larger ribs to provide plushness under a pull tab in accordance with an embodiment.

In the example of FIG. 21, pull tab region 104 includes larger ribs 44 than the surrounding regions of ribbed fabric 60 in order to provide a plush surface under pull tab 32. In particular, ribs 44 in region 104 on side 50A of fabric 60 may include ribs 44 of a first height H3 in region 104, whereas ribs 44 outside of region 104 on side 50A of fabric 60 may include ribs 44 of a second height H2 that is smaller than height H3. Ribs 44 on side 50B may be absent in region 104 or may have a smaller or larger height similar to ribs 44 in region 104 on side 50A. Providing additional height under pull tab 32 on side 50A (e.g., the side of fabric 60 that faces away from opening 34 and device 10) brings pull tab slightly away from opening 34 to ensure that pull tab 32 does not interfere with device insertion.

Figure 22:
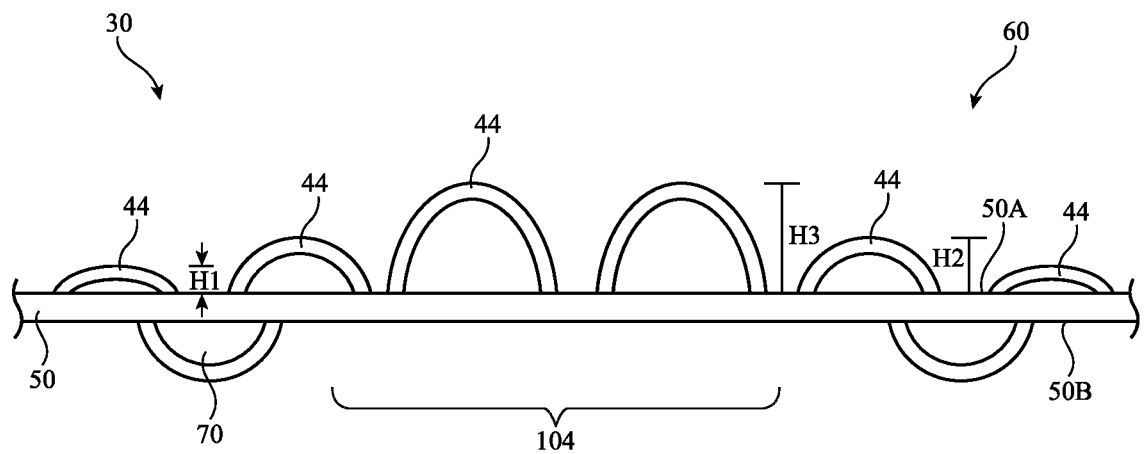
FIG. 22 is a side view of an illustrative ribbed fabric sidewall having ribs with tapered heights to provide plushness under a pull tab in accordance with an embodiment.

In the example of FIG. 22, pull tab region 104 includes ribs 44 with tapered heights to provide a plush surface under pull tab 32. In particular, ribs 44 in region 104 on side 50A of fabric 60 may include ribs 44 of a first height H3 and ribs of a second height H2 (e.g., a height smaller than height H3) in region 104, whereas ribs 44 outside of region 104 on side 50A of fabric 60 may include ribs 44 of a second height H1 that is smaller than height H2 and height H3. Ribs 44 on side 50B may be absent in region 104 or may have a smaller or larger height similar to ribs 44 in region 104 on side 50A. Providing additional height under pull tab 32 on side 50A (e.g., the side of fabric 60 that faces away from opening 34 and device 10) brings pull tab slightly away from opening 34 to ensure that pull tab 32 does not interfere with device insertion.

Figure 23:
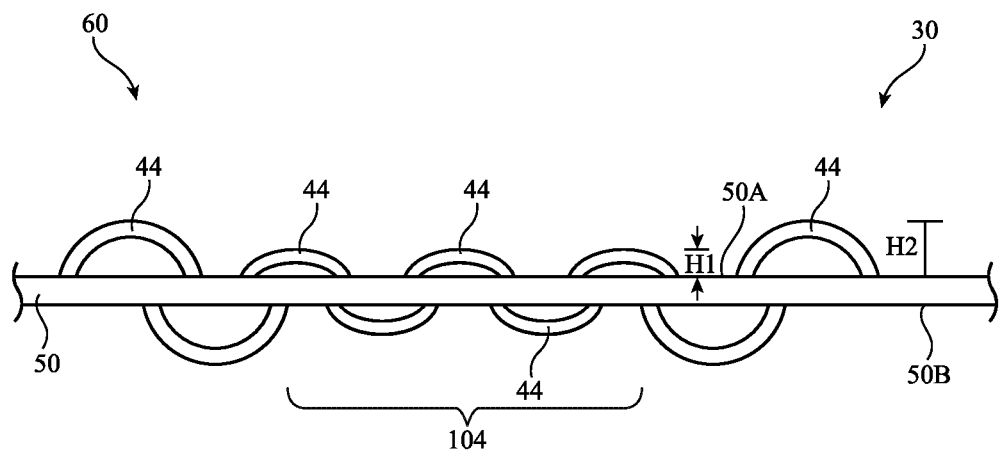
FIG. 23 is a side view of an illustrative ribbed fabric sidewall having a region with ribs of different heights on both sides of an inner fabric layer to accommodate a pull tab in accordance with an embodiment.

In the example of FIG. 23, pull tab region 104 includes ribs 44 on both sides 50A and 50B of inner fabric layer 50 that have a different height from ribs 44 in other regions of fabric 60. In particular, ribs 44 in region 104 on side 50A and 50B of fabric 60 may have a first height H1, whereas ribs 44 outside of region 104 on side 50A and 50B of fabric 60 may have a second height H2 that is larger than height H1. This is merely illustrative. If additional plushness under pull tab 32 is desired, the height of ribs 44 in pull tab region 104 on both sides 50A and 50B may be greater than the height of ribs 44 outside of region 104.

Figure 24:
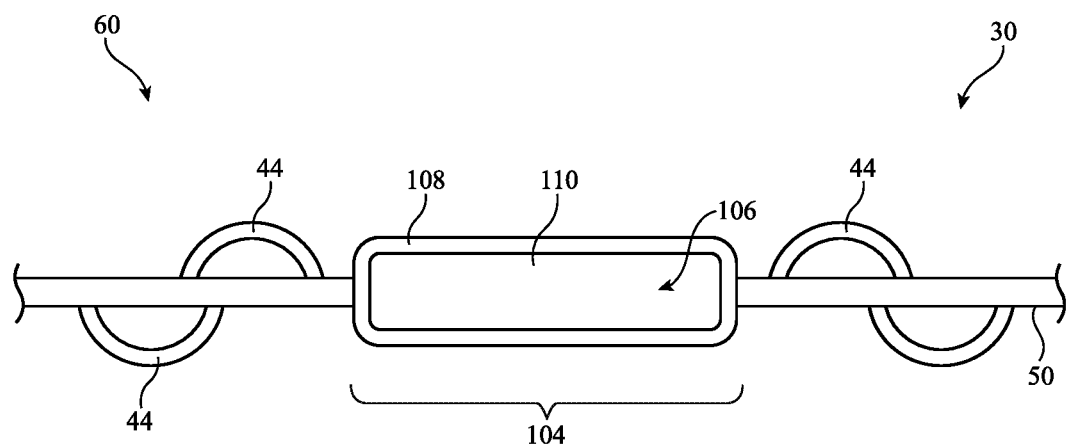
FIG. 24 is a side view of an illustrative ribbed fabric sidewall having a stuffed pocket region to provide plushness under a pull tab in accordance with an embodiment.

In the example of FIG. 24, fabric 60 has a pocket such as pocket 106 in pull tab region 104. Pocket 106 may be filled with filler material such as filler material 110. Filler material 110 may be strands of material that form a thick fabric layer within pocket 106, or filler material 110 may be formed from silicone, foam, polymer, and/or other suitable materials that can fill pocket 106 to achieve the desired level of thickness under pull tab 32.

In general, button receiving region 78 and pull tab region 104 of ribbed fabric 60 may have one or more properties that are different than the surrounding regions of ribbed fabric 60. For example, material properties of ribs 44 such as the fusibility of strands 56, the density of the knit construction, the diameter of strands 56, the number of strands 56, the material of strands 56 (e.g., polyethylene terephthalate versus silicone, etc.), and/or other material properties of ribs 44 may be different in regions 78 and 104 than other regions of fabric 60. Strands 56 with larger diameters and/or with double the number of strands in a given area may be used to change the material properties within region 78 and/or region 104. Fusible or low temperature melt yarns can be locally melted to achieve stiffer regions. In some arrangements, button receiving region 78 and/or pull tab region 104 may include locally melted fusible yarns whereas other portions of ribbed fabric 60 may be non-fusible or may be formed from fusible yarn that is not melted.

Figure 25:
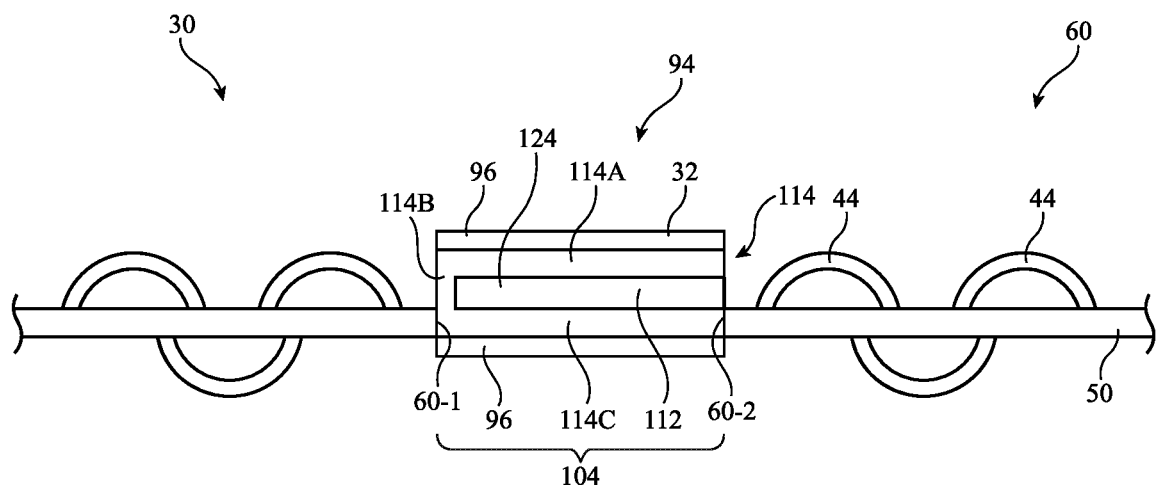
FIG. 25 is a side view of an illustrative ribbed fabric sidewall having a U-shaped seam that is hidden under a pull tab in accordance with an embodiment.

In the example of FIG. 25, seam 94 between opposing edges of fabric 60 is constructed to provide the desired level of thickness under pull tab 32 in region 104. In particular, a U-shaped fabric layer such as U-shaped fabric layer 114 may be formed on first edge 60-1 of fabric 60, and filler material 112 may be formed on opposing second edge 60-2 of fabric 60. Filler material 112 may be strands of material that form a thick fabric layer, or filler material 112 may be formed from silicone, foam, polymer, and/or other suitable materials. U-shaped fabric layer 114 may have portions 114A, 114B, and 114C that together form a pocket such as pocket 124. When edges 60-1 and 60-2 are joined, filler material 112 may be inserted into pocket 124. Fabric 96 of pull tab 32 may then attached to opposing sides of seam 94. In particular, a first portion of loop fabric 96 may cover an upper surface of seam 94 and a second portion of loop fabric 96 may cover a lower surface of seam 94. If desired, stitching, adhesive, or other attachment materials may be used to attach the stack of fabric layers together in pull tab region 104. Filler material 112 within pocket 124 may form a plush surface on which to form pull tab 32 so that pull tab 32 is shifted slightly away from opening 34 where it might otherwise interfere with insertion of device 10 into cover 26.

Figure 26:
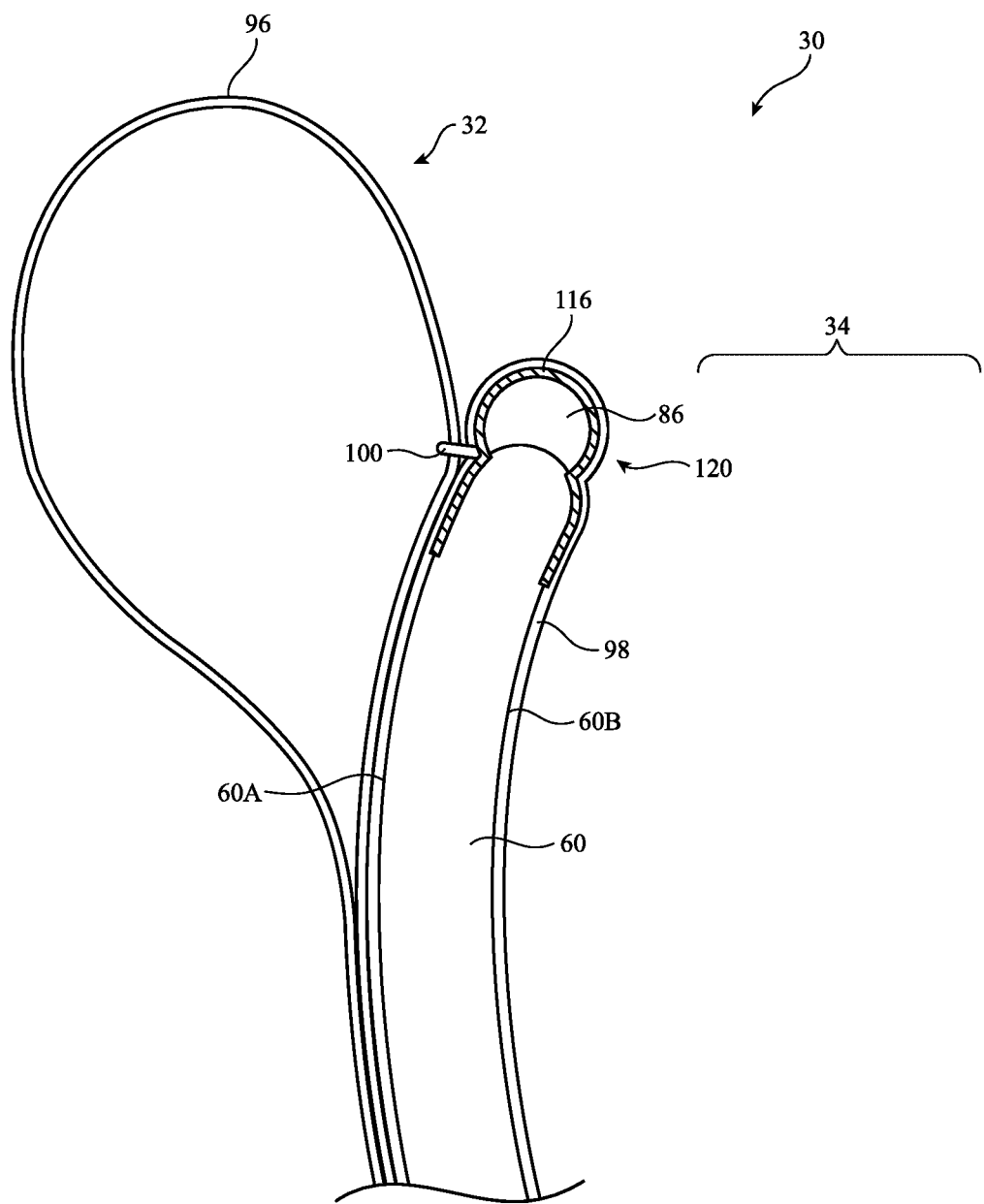
FIG. 26 is a side view of an illustrative ribbed fabric sidewall having a fabric layer that hides piping under a pull tab in accordance with an embodiment.

FIG. 26 is a side view of pull tab 32 on sidewall 30 showing how an extra layer of fabric may be used to help hide piping such as piping 86 in sidewall 30. Piping 86 may extend along peripheral edge 120 of fabric 60 and may fully or partially frame opening 34. If care is not taken, piping 86 can show through fabric 98 of pull tab 32. To avoid deformations in fabric 98 that might otherwise arise from the presence of piping 86, an additional layer of material such as layer 116 may be interposed between fabric layer 98 of pull tab 32 and piping 86 of fabric 60. Layer 116 may be a layer of fabric (e.g., taffeta or any other suitable fabric) that helps provide a smooth surface under fabric 98 without bumps or other visible artifacts that might otherwise be visible if piping 86 were to show through fabric 98.

As described above, one aspect of the present technology is the gathering and use of information such as information from input-output devices. The present disclosure contemplates that in some instances, data may be gathered that includes personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, username, password, biometric information, or any other identifying or personal information.

The present disclosure recognizes that the use of such personal information, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the United States, collection of or access to certain health data may be governed by federal and/or state laws, such as the Health Insurance Portability and Accountability Act (HIPAA), whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to provide certain types of user data. In yet another example, users can select to limit the length of time user-specific data is maintained. In addition to providing "opt in" and "opt out" options, the present disclosure contemplates providing notifications relating to the access or use of personal information. For instance, a user may be notified upon downloading an application ("app") that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of information that may include personal information data to implement one or more various disclosed embodiments, the present disclosure also contemplates that the various embodiments can also be implemented without the need for accessing personal information data. That is, the various embodiments of the present technology are not rendered inoperable due to the lack of all or a portion of such personal information data.

The foregoing is merely illustrative and various modifications can be made to the described embodiments. The foregoing embodiments may be implemented individually or in any combination.

What is claimed is:

1. A protective cover for a head-mounted device having an external display, the protective cover comprising:
   a cover layer configured to cover the external display, wherein the cover layer comprises a foam layer interposed between inner and outer fabric layers; and
   a ribbed fabric sidewall that extends around a periphery of the cover layer, wherein the cover layer and the ribbed fabric sidewall together form a recess configured to receive the head-mounted device.

2. The protective cover defined in claim 1 wherein the ribbed fabric sidewall comprises a knit fabric having first and second opposing surfaces, first knit ribs on the first surface, and second knit ribs on the second surface.

3. The protective cover defined in claim 2 wherein the first and second knit ribs have a first gauge and the knit fabric has a second gauge that is one half of the first gauge.

4. The protective cover defined in claim 2 wherein the first and second knit ribs have a first gauge and the knit fabric has a second gauge that is equal to the first gauge.

5. The protective cover defined in claim 2 wherein at least some of the first and second knit ribs are filled with a filler material.

6. The protective cover defined in claim 2 wherein the ribbed fabric sidewall has a button receiving region configured to align with a button on the head-mounted device, and wherein the button receiving region includes a gap in the second knit ribs on the second surface.

7. The protective cover defined in claim 2 wherein the ribbed fabric sidewall has a button receiving region configured to align with a button on the head-mounted device, and wherein the second knit ribs have a reduced height in the button receiving region relative to other regions of the second surface.

8. The protective cover defined in claim 2 wherein the ribbed fabric sidewall has a button receiving region configured to align with a button on the head-mounted device, and wherein the second knit ribs include unfilled ribs in the button receiving region and filled ribs outside of the button receiving region.

9. The protective cover defined in claim 2 wherein the knit fabric has piping along an edge of the knit fabric that at least partially frames the recess.

10. The protective cover defined in claim 1 further comprising at least one pull tab on the ribbed fabric sidewall.

11. The protective cover defined in claim 10 wherein the ribbed fabric sidewall has first and second edges that are attached along a seam and wherein the at least one pull tab is configured to hide the seam.

12. The protective cover defined in claim 1 wherein the cover layer comprises at least one stiffener interposed between the inner and outer fabric layers.

13. A removable case for a head-mounted device having an external display, the removable case comprising:
   a cushion layer configured to cover the external display;
   a microfiber fabric that covers the cushion layer;
   a fabric sidewall coupled to the cushion layer, wherein the fabric sidewall comprises ribbed fabric and surrounds an opening that is configured to receive the head-mounted device; and
   a pull tab located on the fabric sidewall and configured to hide a seam in the fabric sidewall.

14. The removable case defined in claim 13 wherein the pull tab comprises first and second layers of fabric, wherein the first layer of fabric forms a loop and the second layer of fabric wraps around the fabric sidewall, and wherein the first and second layers of fabric are attached together using stitching.

15. The removable case defined in claim 13 wherein the fabric sidewall has first and second edges that are attached along the seam, wherein the first edge has a U-shaped fabric layer that forms a pocket and the second edge comprises filler material that fills the pocket, and wherein the pull tab comprises a fabric layer that sandwiches the pocket and the filler material.

16. The removable case defined in claim 13 wherein the ribbed fabric has ribs that extend around the opening and wherein some of the ribs are located under the pull tab and have a greater height than other ribs in the ribbed fabric.

17. The removable case defined in claim 13 wherein the ribbed fabric has piping that extends around the opening, the removable case further comprising a layer of fabric interposed between the piping and the pull tab.

18. A fabric cover for an electronic device having an outer glass layer, the fabric cover comprising:
   a cover layer configured to cover the outer glass layer, wherein the cover layer comprises a foam layer and a stiffener that are wrapped in fabric; and
   a flexible fabric sidewall comprising a ribbed knit fabric, wherein the ribbed knit fabric has a button receiving region and a pull tab region in which the ribbed knit fabric is modified relative to other regions of the ribbed knit fabric.

19. The fabric cover defined in claim 18 wherein the ribbed knit fabric has fewer ribs in the button receiving region relative to the other regions of the ribbed knit fabric.

20. The fabric cover defined in claim 18 wherein the ribbed knit fabric has ribs of a first height in the pull tab region and has ribs of a second height in the other regions, and wherein the first and second heights are different.

21. The fabric cover defined in claim 18 wherein the ribbed knit fabric in at least one of the button receiving region or the pull tab region has at least one property that is different from the other regions of the ribbed knit fabric, and wherein the at least one property is selected from the group consisting of: strand fusibility, density of knit construction, strand diameter, number of strands, and strand material.

22. The fabric cover defined in claim 18 wherein the flexible fabric sidewall has edge portions without ribs, wherein a seam attaches the edge portions to the cover layer, and wherein the edge portions comprise fusible strands.

23. The fabric cover defined in claim 18 wherein the flexible fabric sidewall has piping that extends along an edge of the ribbed knit fabric and that contains at least one strand, and wherein the piping is configured to retain the fabric cover on the electronic device.

24. The fabric cover defined in claim 23 wherein the piping has at least one property that is different from the ribbed knit fabric and wherein the at least one property is selected from the group consisting of: strand fusibility, density of knit construction, strand diameter, number of strands, and strand material.

25. The fabric cover defined in claim 18 wherein the pull tab region is located in at least one position selected from the group consisting of: a left side of the flexible fabric sidewall, a right side of the flexible fabric sidewall, a top side of the flexible fabric sidewall, and a bottom side of the flexible fabric sidewall.

* * * * *